(12) United States Patent
Fan et al.

(10) Patent No.: US 11,814,299 B2
(45) Date of Patent: Nov. 14, 2023

(54) METHOD FOR SEPARATION OF RARE EARTH ELEMENTS FROM COAL ASH USING SUPERCRITICAL CARBON DIOXIDE

(71) Applicant: UNIVERSITY OF WYOMING, Laramie, WY (US)

(72) Inventors: Maohong Fan, Ames, IA (US); Zaixing Huang, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 143 days.

(21) Appl. No.: 17/316,315

(22) Filed: May 10, 2021

(65) Prior Publication Data

US 2021/0347652 A1    Nov. 11, 2021

Related U.S. Application Data

(60) Provisional application No. 63/022,643, filed on May 11, 2020.

(51) Int. Cl.
| | | |
|---|---|---|
| C01F 17/00 | (2020.01) | |
| C01F 17/10 | (2020.01) | |
| C01F 17/224 | (2020.01) | |
| C22B 3/16 | (2006.01) | |
| C22B 3/06 | (2006.01) | |
| C22B 59/00 | (2006.01) | |

(52) U.S. Cl.
CPC ............ *C01F 17/10* (2020.01); *C01F 17/224* (2020.01); *C22B 3/06* (2013.01); *C22B 3/165* (2013.01); *C22B 59/00* (2013.01)

(58) Field of Classification Search
CPC .......... C01F 17/10; C01F 17/224; C22B 3/06; C22B 3/165; C22B 59/00
See application file for complete search history.

(56) References Cited

FOREIGN PATENT DOCUMENTS

| WO | WO 2013/138900 | * | 9/2013 |
| WO | WO 2013/177583 | * | 11/2013 |
| WO | WO 2019/193413 | * | 10/2019 |

* cited by examiner

*Primary Examiner* — Steven J Bos
(74) *Attorney, Agent, or Firm* — Patterson + Sheridan, LLP

(57) ABSTRACT

Embodiments of the present disclosure generally relate to the recovery and extraction of rare earth elements. More specifically, embodiments of the disclosure relate to methods for separating rare earth elements from coal, coal by-product(s), and/or coal-derived product(s). In an embodiment, a method of removing rare earth elements from a coal-derived product is provided. The method generally includes introducing supercritical $CO_2$ to the coal ash to form a first mixture, introducing a first acid to the first mixture to form a second mixture, and removing a first composition from the second mixture, the first composition comprising the one or more rare earth elements.

18 Claims, 9 Drawing Sheets

METHOD FOR SEPARATION OF RARE EARTH ELEMENTS FROM COAL ASH USING SUPERCRITICAL CARBON DIOXIDE

CROSS-REFERENCE TO RELATED APPLICATIONS

This application claims priority to U.S. Provisional Patent Application No. 63/022,643, filed May 11, 2020, which is incorporated herein by reference in its entirety.

GOVERNMENT RIGHTS

This invention was made with U.S. government support under contract number DE-FE00027069 awarded by the Department of Energy. The U.S. government has certain rights in this invention.

BACKGROUND

Field

Embodiments of the present disclosure generally relate to the recovery and extraction of rare earth elements. More specifically, embodiments of the disclosure relate to methods for separating rare earth elements from coal, coal by-product(s), and/or coal-derived product(s).

Description of the Related Art

Rare earth elements (REEs) are a group of 17 chemical elements in the periodic table, including scandium, yttrium, and 15 lanthanides. REEs are widely used in high technology products such as permanent magnets, lasers, health care devices, catalysts, rechargeable batteries, military products, and various other devices. Due to their electromagnetic, metallurgical, and optical properties, REEs also play irreplaceable roles in global clean energy technology development.

Various projections conclude that the annual demand of REEs is increasing at a rate of approximately 4-9% per year. However, the production of REEs remains limited to certain countries due to resource constraints, technical limitations, regulatory hurdles, and capital costs. Also, REE reserves are not evenly distributed around the world, with China, Brazil, Vietnam, and Russia accounting for over 88% of the estimated world reserves. Due to environmental concerns and the location of the REE deposits, the United States relies almost entirely on imported REEs.

Unconventional REE-containing resources, such as produced water, acid-mine drainage, coal, coal by-product(s), and/or coal-derived product(s), contain significant amounts of REEs. However, the concentration of REEs in these and other unconventional resources are several orders of magnitude lower than that of REE ores. Thus, techniques for economically and environmentally friendly extraction of REEs from unconventional resources remains challenging.

There is a need for new methods for separating rare earth elements from unconventional REE-containing resources.

SUMMARY

Embodiments of the present disclosure generally relate to the recovery and extraction of rare earth elements. More specifically, embodiments of the disclosure relate to methods for separating rare earth elements from coal, coal by-product(s), and/or coal-derived product(s).

In an embodiment, a method of removing rare earth elements from a coal-derived product is provided. The method generally includes introducing supercritical $CO_2$ to the coal-derived product to form a first mixture, introducing a first acid to the first mixture to form a second mixture, and removing a first composition from the second mixture, the first composition comprising the one or more rare earth elements.

In another embodiment, a method of removing a rare earth element from a coal-derived product is provided. The method includes disposing the coal-derived product in a reactor, the coal-derived product comprising the rare earth element and a metal, the metal comprising Al, Fe, or a combination thereof. The method further includes contacting the coal-derived product with supercritical $CO_2$ and an acid to form a mixture, removing at least a portion of the metal from the mixture to form a first composition having a reduced content of the metal, and precipitating a second composition from the first composition, the second composition comprising the rare earth element from the mixture.

In another embodiment, a method of separating one or more rare earth elements from a coal-derived product is provided. The method includes disposing the coal-derived product in a reactor, the coal-derived product comprising a first component and a second component, the first component comprising one or more rare earth elements, the second component being different from the first component. The method further includes removing at least a first portion of the first component from the coal-derived product with supercritical $CO_2$ and a first acid, and removing at least a second portion of the first component from the coal-derived product with supercritical $CO_2$ and a second acid.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to the recovery and extraction of rare earth elements. More specifically, embodiments of the disclosure relate to methods for separating rare earth elements from coal, coal by-product(s), and/or coal-derived product(s). Briefly, the method includes introducing supercritical carbon dioxide ($CO_2$) and an acid with coal, coal by-product(s), and/or coal-derived product(s) (e.g., coal ash) to remove one or more rare earth elements (REE(s)). As a non-limiting example, supercritical $CO_2$ and acid is mixed with the coal, coal by-product(s), and/or coal-derived product(s). The acid, such as HCl, reacts with the REE(s) to form, e.g., a composition, a complex, and/or a coordination compound comprising the REE(s) such as REE(HCl). The composition, complex, and/or coordination compound can be soluble in the supercritical $CO_2$. The $CO_2$ can be vaporized by removing the pressure, and the REE(HCl) can be further processed by, e.g., precipitation and/or further enrichment into REEs and/or REE oxides. The supercritical $CO_2$ also acts as a Lewis acid for extracting one or more rare earth elements. The supercritical $CO_2$ can enhance the recovery of rare earth elements from coal, coal by-product(s), and/or coal-derived product(s). For example, and in some embodiments, use of supercritical $CO_2$ can increase the amount of rare earth elements recovered by about 10% or more, such as about 20% or more, such as about 25% or more, relative to methods free of supercritical $CO_2$. In at least one example, the rare earth elements can be enriched from about 300 ppm or less in coal ashes to about 2 wt % or more.

The methods described herein enable recovery of rare earth element from coal by-product(s), and/or coal-derived product(s), such as coal ash. The methods are cost-effective and enable industrial-scale enrichment of rare earth elements from unconventional resources such as coal and other coal utilization by-products. The methods described herein enable domestic production of rare earth elements as they are more environmentally friendly than conventional methods of producing rare earth elements. For example, conventional methods utilize tributyl phosphate for the separation of rare earth elements. In contrast, the methods described herein are free of tributyl phosphate.

Figure 1A:
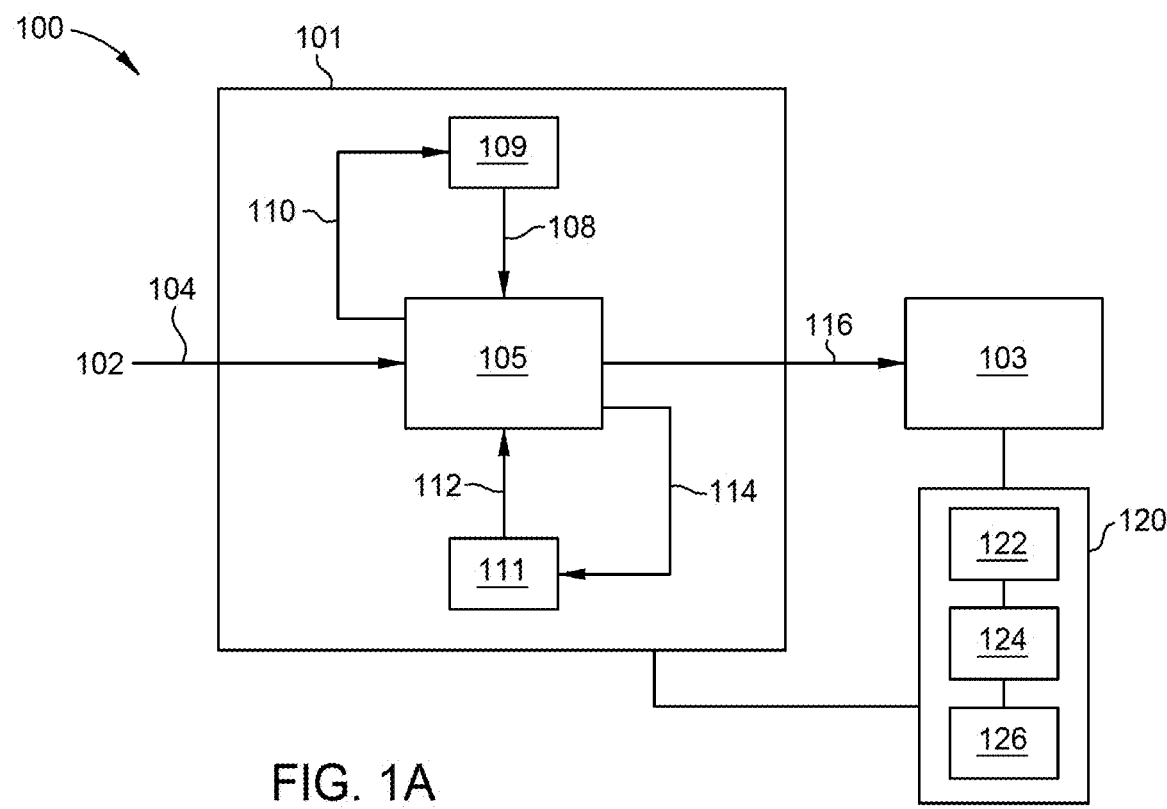
FIG. 1A is an example apparatus for performing one or more operations for separating rare earth elements from coal, coal by-product(s), and/or coal-derived product(s) according to at least one embodiment of the present disclosure.

FIG. 1A is an example apparatus 100 for separating, extracting, isolating, or otherwise removing one or more rare earth elements from coal, coal by-product(s), and/or coal-derived product(s) 102. The rare earth elements that can be extracted using apparatus 100 include scandium (Sc), yttrium (Y), a lanthanide (e.g., lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and/or lutetium (Lu)), or combinations thereof. The apparatus 100 generally includes an extraction unit 101 coupled to a furnace 103 (e.g., a high-temperature furnace). The apparatus 100 can include more than one extraction unit 101 and/or more than one furnace 103 based on, e.g., the desired throughput.

The coal, coal by-product(s), and/or coal-derived product(s) 102 can be fed to the apparatus 100 via line 104. The line 104 can include a conveyor configured to transport the coal, coal by-product(s), and/or coal-derived product(s) 102 to the extraction unit 101. Prior to entering the extraction unit 101, and as described below, the coal, coal by-product(s), and/or coal-derived product(s) 102 can be milled to a selected size and/or treated, chemically and/or physically.

The extraction unit 101 includes a reactor 105 (or a vessel, unit, column, or similar apparatus) configured to introduce the coal, coal by-product(s), and/or coal-derived product(s) 102 with supercritical $CO_2$ to form a mixture. The reactor 105 is also configured to introduce this mixture, and/or other materials associated with the extraction, with an acid. The reactor 105 can be in the form of one or more reactors, one or more vessels, one or more columns, and/or one or more units which may be operated simultaneously in parallel or operated sequentially in series. The reactor 105 is coupled to a $CO_2$ tank 109 via a line 108 through which $CO_2$ is flowed to the reactor 105. The $CO_2$ may be recycled back to the $CO_2$ tank 109 via line 110. Although not shown, the extraction unit 101 can include one or more devices (e.g., membranes, filters, liquid-liquid extraction apparatus and other extraction apparatus, chillers, or other suitable devices), for separating various solids from other solids, liquids from other liquids, and/or solids from liquids. Operating conditions of the extraction unit 101, and elements of the extraction unit 101 such as reactor 105, are described below and can be controlled by controller 120.

An acid, such as an inorganic acid or an organic acid, water (or other suitable solvent), or combinations thereof, can be delivered from a tank 111 to the reactor 105 via a line 112. The acid and/or water (or other suitable solvent) can be recycled back to the tank 111 via line 114. As an example, an acid can be flowed from tank 111 into the reactor 105 where it can contact the coal, coal by-product(s), and/or coal-derived product(s) 102, the supercritical $CO_2$, and/or the mixture thereof. Selection of the acid enables selective removal of one or more rare earth elements and/or other materials from the coal, coal by-product(s), and/or coal-derived product(s) 102. For example, a first acid can be utilized to extract an impurities and/or undesired metal (e.g., Al, Fe, Ca, Na, Si, Mg, Zn, Cu, Ti, or combinations thereof), while a second acid can be utilized to extract a rare earth element, or vice-versa. If desired, a third acid can be utilized to extract a specific rare earth element, while a third acid can be utilized to extract a specific impurity and/or undesired metal. Additional acid(s) may be utilized. Extraction with supercritical $CO_2$ and acid enables one or more materials (e.g., one or more rare earth elements, one or more complexes containing a rare earth element, and/or one or more compositions containing a rare earth element) to be obtained.

After extraction in the extraction unit 101, the one or more materials (e.g., a rare earth element, a complex containing a rare earth element, a composition containing a rare earth element, or combinations thereof) can be fed via line 116 to the furnace 103. The furnace 103 can be used for de-watering and/or thermal decomposition of these materials. In some examples, the furnace 103 can be operated up to a temperature of about 3,000° C., though higher temperatures are contemplated. Operating conditions of the furnace 103 can be controlled by the controller 120.

Although not shown in FIG. 1A, the apparatus 100 can further include a device to further separate, extract, isolate, or otherwise remove one or more rare earth elements and or undesired metals from surrounding materials. The device can be, e.g., an ion exchange column, a device configured to coagulate the extracted sample, a device configured to perform metallothermic reduction to obtain the elemental rare earth element, a device configured to precipitate an REE complex (e.g., REE oxide, REE oxalate) or other insoluble complex, coordination compound containing a rare earth element, or a composition containing a rare earth element. More than one of these devices can be utilized.

It is contemplated that one or more of the elements described in FIG. 1A may be coupled to the controller 120. The controller 120 is utilized to control one or more operating parameters of the one or more elements of apparatus 100. The controller 120 includes a processor 122, memory 124, and support circuit 126. The processor 122 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The support circuit 126 is coupled to the processor 122 and may include cache, clock circuits, input/output systems, power supplies, and the like.

The memory 124 is non-transitory and may be one or more of readily available memory such as random access memory (RAM), read only memory (ROM), or any other form of digital storage, local or remote. The memory 124 contains instructions, that when executed by the processor 122, facilitates the operation the apparatus of FIG. 1A and the operations of method 200. The instructions in the memory 124 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure. In one example, the disclosure may be implemented as the program product stored on a computer-readable storage media (e.g., memory 124) for use with a computer system (not shown). The program(s) of the program product define functions of the disclosure, described herein.

Figure 1B:
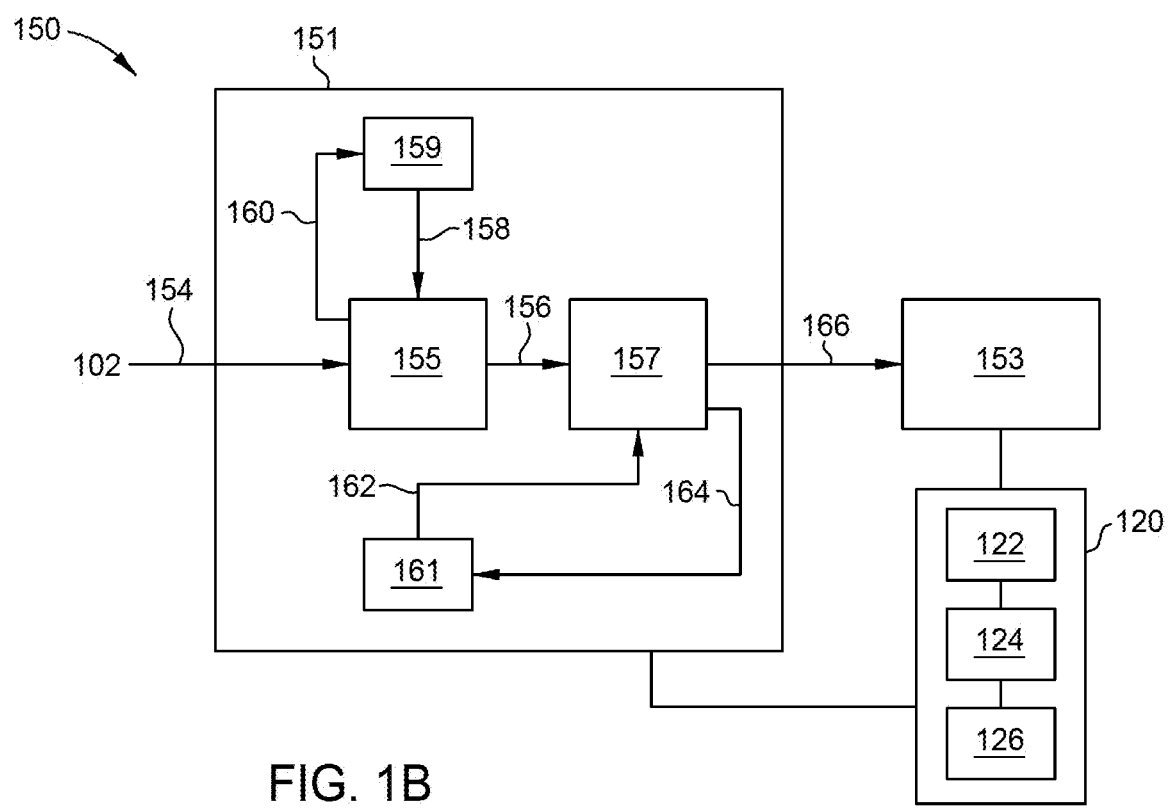
FIG. 1B is an example apparatus for performing one or more operations for separating rare earth elements from coal, coal by-product(s), and/or coal-derived product(s) according to at least one embodiment of the present disclosure.

FIG. 1B is an example apparatus 150 for separating, extracting, isolating, or otherwise removing one or more rare earth elements from coal, coal by-product(s), and/or coal-derived product(s) 102. The rare earth elements that can be extracted using apparatus 150 include Sc, Y, lanthanide(s), or combinations thereof. The apparatus 150 generally includes an extraction unit 151 coupled to a furnace 153 (e.g., a high-temperature furnace). The apparatus 150 can include more than one extraction unit 151 and/or more than one furnace 153 based on, e.g., the desired throughput.

The coal, coal by-product(s), and/or coal-derived product(s) 102 can be fed to the apparatus 150 via line 154. The line 154 can include a conveyor configured to transport the coal, coal by-product(s), and/or coal-derived product(s) 102 to the extraction unit 151. Prior to entering the extraction unit 151, and as described below, the coal, coal by-product(s), and/or coal-derived product(s) 102 can be milled to a selected size and/or treated, chemically and/or physically.

The extraction unit 151 includes a supercritical $CO_2$ extraction unit 155 coupled to a liquid-liquid extraction unit 157 by a line 156. One or more rare earth elements and/or materials containing one or more rare earth elements can be removed from the coal, coal by-product(s), and/or coal-derived product(s) 102 in the supercritical $CO_2$ extraction unit 155, the liquid-liquid extraction unit 157, or both.

The supercritical $CO_2$ extraction unit 155 is configured to introduce the coal, coal by-product(s), and/or coal-derived product(s) 102 with supercritical $CO_2$ to form a mixture. The supercritical $CO_2$ extraction unit 155 can be in the form of one or more vessels, one or more columns, and/or one or more reactors which may be operated simultaneously in parallel or operated sequentially in series. The supercritical $CO_2$ extraction unit 155 is coupled to a $CO_2$ tank 159 via a line 158 through which $CO_2$ is flowed to the supercritical $CO_2$ extraction unit 155. The $CO_2$ may be recycled back to the $CO_2$ tank 109 via line 110. Although not shown, the extraction unit 151 can include one or more devices (e.g., membranes, filters, liquid-liquid extraction apparatus and other extraction apparatus, chillers, or other suitable devices), for separating various solids from other solids, liquids from other liquids, and/or solids from liquids. Operating conditions of the extraction unit 151, and elements of the extraction unit 151 such as the supercritical $CO_2$ extraction unit 155, are described below and can be controlled by a controller 120.

The liquid-liquid extraction unit 157 is configured to extract one or more materials (e.g., a rare earth element, a complex containing a rare earth element, a composition containing a rare earth element, or combinations thereof). The liquid-liquid extraction unit 157 can be in the form of one or more vessels, one or more columns, and/or one or more reactors which may be operated simultaneously in parallel or operated sequentially in series.

An acid, such as an inorganic acid or an organic acid, water (or other suitable solvent), or combinations thereof, can be delivered from tank 161 to the liquid-liquid extraction unit 157 via a line 162. The acid(s) and/or water (or other suitable solvent) can be recycled via line 164. As an example, acid(s) can be flowed from tank 161 into the liquid-liquid extraction unit 157 where it can contact the mixture comprising the coal, coal by-product(s), and/or coal-derived product(s) 102, the supercritical $CO_2$, and/or the mixture thereof. Selection of the acid enables selective removal of one or more rare earth elements and/or other materials from the coal, coal by-product(s), and/or coal-derived product(s) 102. For example, a first acid can be utilized to extract a impurities and/or an undesired metal (e.g., Al, Fe, Ca, Na, Si, Mg, Zn, Cu, Ti, or combinations thereof), while a second acid can be utilized to extract a rare earth element, or vice-versa. If desired, a third acid can be utilized to extract a specific rare earth element, while a third acid can be utilized to extract a specific impurity and/or undesired metal. Additional acid(s) may be utilized. Extraction with both the supercritical $CO_2$ and acid enables one or more materials (e.g., one or more rare earth elements, one or more complexes containing a rare earth element, and/or one or more compositions containing a rare earth element) to be obtained.

After extraction in the extraction unit 151, the one or more metal materials (e.g., a rare earth element, a complex containing a rare earth element, a composition containing a rare earth element, or combinations thereof) can be fed via line 166 to the furnace 153. The furnace 153 can be used for de-watering and/or thermal decomposition of these materials. In some examples, the furnace 103 can be operated up to a temperature of about 3,000° C., though higher temperatures are contemplated. Operating conditions of the furnace 153 can be controlled by the controller 120.

Although not shown in FIG. 1B, the apparatus 150 can further include a device to further separate, extract, isolate, or otherwise remove one or more rare earth elements and or undesired metals from surrounding materials. The device can be, e.g., an ion exchange column, a device configured to coagulate the extracted sample, a device configured to perform metallothermic reduction to obtain the elemental rare earth element, a device configured to precipitate an REE complex (e.g., REE oxide, REE oxalate) or other insoluble complex, coordination compound containing a rare earth element, or a composition containing a rare earth element. More than one of these devices can be utilized.

In some embodiments, the supercritical $CO_2$ extraction unit 155 and the liquid-liquid extraction unit 157 is a single unit. In such embodiments, for example, $CO_2$ tank 159, tank 161, and lines 158, 160, 162, and 164 are coupled to a single unit configured to perform extraction with supercritical $CO_2$ and acid(s) of the coal, coal by-product(s), and/or coal-derived product(s).

It is contemplated that one or more of the elements described in FIG. 1B may be coupled to the controller 120.

The controller 120 is utilized to control one or more operating parameters of the one or more elements of apparatus 150. The controller 120 includes a processor 122, memory 124, and support circuit 126. Controller 120, processor 122, memory 124, and support circuit 126 are described above in relation to FIG. 1A.

Although not shown in FIGS. 1A and 1B, it should be understood that equipment for controlling, e.g., temperature, pressure, and flow control of various feeds used with the apparatus 100, 150. For example, heat exchangers can be used to cool or heat a liquid or a gas along the feed lines or within various units of the apparatus 100, 150, while pumps and motors can be utilized to control the rate of flow of the materials and the operating pressures in apparatus 100, 150. Further, apparatus 100, 150 may include features for facilitating separation and/or purification of components as well as valves or other release mechanisms for, e.g., purging gases or liquids from the system. Various process controls can be used. Such process controls can include probes and sensors such as pressure indicators, differential pressure cells, temperature indicators, thermocouples, temperature switches, resistance temperature detectors, solenoids, flowmeters, flow regulators and valves, gas analyzers, humidity sensors, radar sensors, ammeters, current meters, liquid level detectors, feed level probes, electrical drives, and combinations thereof.

Apparatus 100 or 150 can be used individually to perform one or more operations for separating a rare earth element from coal, coal by-product(s), and/or coal-derived product(s) described below. Other apparatus capable of performing one or more such operations may also be adapted to benefit the implementations described herein. In addition, any suitable system enabling one or more operations for separating a rare earth element from coal, coal by-product(s), and/or coal-derived product(s) described herein can be used. The apparatus description described herein is illustrative and should not be construed or interpreted as limiting the scope of the implementations described herein.

The coal, coal by-product(s), and/or coal-derived product(s) 102 useful for embodiments described herein can be from any suitable source such as the Powder River Basin (PRB), Utah coal, Virginia coal, Kentucky coal. In some examples, coal ash and/or mine overburden can be utilized. The coal ash can be sourced from any suitable source such as power plant boilers or coal burning furnaces, for example, chain grate boilers, cyclone boilers and fluidized bed boilers, from burning pulverized anthracite or lignite, or bituminous or sub-bituminous coal. Such coal ash includes, e.g., fly ash which can be finely divided coal ash carried from the furnace by exhaust or flue gases, and bottom ash which collects, e.g., at the base of the furnaces or boilers, such as wet bottom boilers or dry bottom boilers, as agglomerates.

The coal, coal by-product(s), and/or coal-derived product(s) 102 (e.g., coal ash and/or mine overburden) can be milled, ground, cut, crushed, or otherwise broken into smaller pieces prior extraction Milling can be performed by suitable methods in the art in order to pulverize and dry the coal, coal by-product(s), and/or coal-derived product(s) 102. The coal, coal by-product(s), and/or coal-derived product(s) 102 can be in the form of nanoparticles, microparticles, and/or macroparticles.

The coal, coal by-product(s), and/or coal-derived product(s) 102 can be untreated or treated. The untreated coal, coal by-product(s), and/or coal-derived product(s) 102 can be used directly in separation methods described herein after milling to a desired particle size. When the coal, coal by-product(s), and/or coal-derived product(s) 102 is desired to have, e.g., different surface properties and/or interfacial properties in the compositions, the coal, coal by-product(s), and/or coal-derived product(s) 102 can be treated by a variety of suitable physical and/or chemical treatment methods such as gas-phase plasma treatment, fluidized bed treatment, etching, ion bombardment, and/or wet chemical processes. The coal, coal by-product(s), and/or coal-derived product(s) 102 can be milled before or after such treatment(s).

In some examples, the coal, coal by-product(s), and/or coal-derived product(s) is ground or milled to a predetermined particle size suitable for a desired application. The coal, coal by-product(s), and/or coal-derived product(s) can then be activated by thermal treatment and/or chemical treatment, if desired. Apparatus to mill or grind the coal can be in the form of a ball mill, rod mill (or slitting mill), autogenous mill, pebble mill, semi-autogenous grinding mill, high pressure grinding roller, buhrstone mill, tower mill, vertical shaft impactor mill, or other suitable apparatus. The mill can also act to separate the ground particles to specific sizes such as micron size. Aggregate milling processes can also be used to remove or separate contaminants (e.g., inorganic materials, organic materials, and/or moisture) from the coal, coal by-product(s), and/or coal-derived product(s). After milling, the coal, coal by-product(s), and/or coal-derived product(s) 102 can have a particle size of about 100 µm or less, such as about 80 µm or less, such as about 60 µm or less, such as about 40 µm or less, such as about 20 µm or less. In other examples, the coal, coal by-product(s), and/or coal-derived product(s) can have a particle size of about 100 mm or smaller, such as from about 0.1 mm to about 20 mm. Larger or smaller particle sizes are contemplated.

The coal, coal by-product(s), and/or coal-derived product(s) can include a first component comprising a rare earth element such as Sc, Y, La, Ce, Pr, Nd, Pm, Sm, Eu, Gd, Tb, Dy, Ho, Er, Tm, Yb, Lu, or combinations thereof. The coal, coal by-product(s), and/or coal-derived product(s) can also include a second component comprising a metal that is not a rare earth element such as Al, Fe, Ca, Na, Si, Mg, Zn, Cu, Ti, or combinations thereof. The operations of method 200 described below enable, e.g., selective removal of at least a portion of first component from the second component, e.g., selective removal of one or more rare earth elements from the metals, impurities, and/or other undesired materials that are not rare earth elements.

Figure 2:
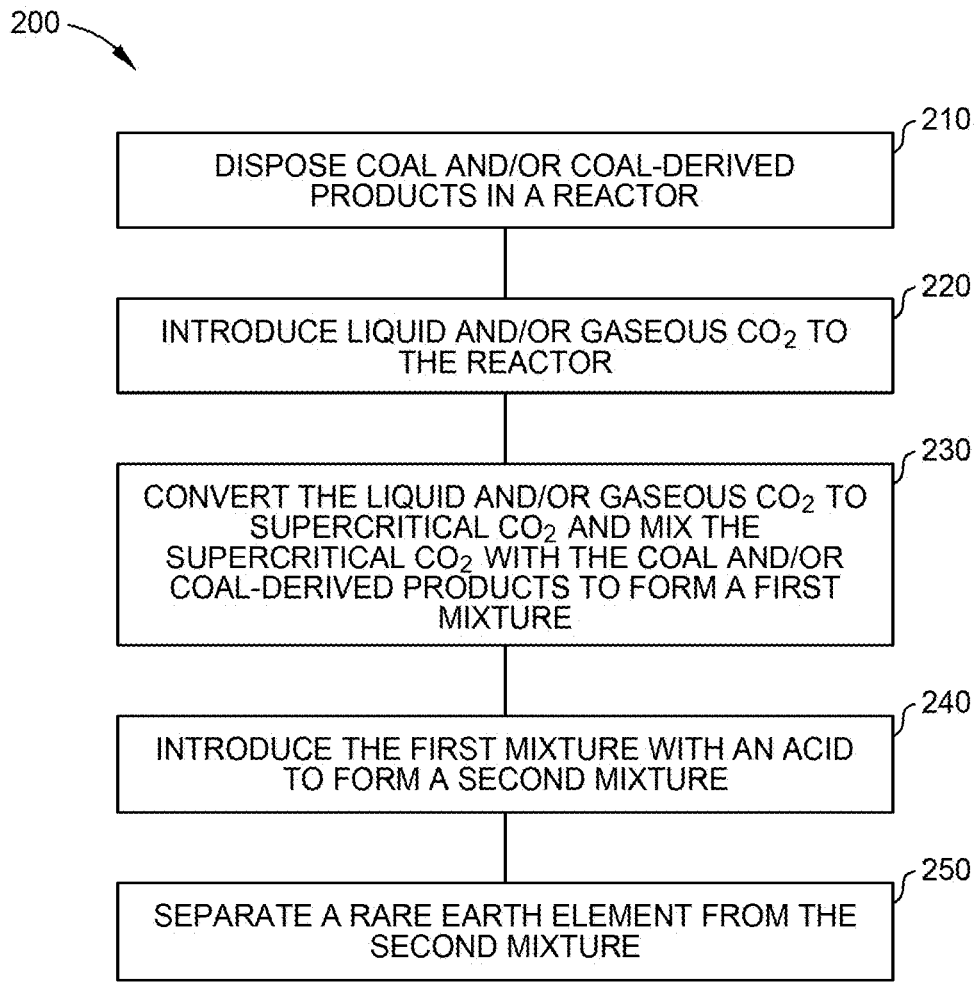
FIG. 2 shows selected operations of an example method for separating rare earth elements from coal, coal by-product(s), and/or coal-derived product(s) according to at least one embodiment of the present disclosure.

FIG. 2 shows selected operations of an example method 200 for separating, extracting, isolating, or otherwise removing one or more rare earth elements from coal, coal by-product(s), and/or coal-derived product(s). Method 200 can be performed in any suitable apparatus for separating a rare earth element from coal, coal by-product(s), and/or coal-derived product(s) such as apparatus 100 and apparatus 150. The one or more rare earth elements separated, extracted, isolated, or otherwise removed from the coal, coal by-product(s), and/or coal-derived product(s) can be in its elemental form, and/or ion form. Additionally, or alternatively, one or more rare earth elements can be in the form of a complex (e.g., where the rare earth element is bound to one or more ligands and/or ions, such as a rare earth element oxide, a rare earth element oxalate, a rare earth element citrate, and/or other rare earth element complexed or bonded to an organic acid or organic acid ion), a coordination compound containing a rare earth element, a composition containing a rare earth element, or combinations thereof. Additionally, or alternatively, other examples of materials that can be recovered from the coal, coal by-product(s), and/or coal-derived product(s) include rare earth element halide, a rare earth element hydrate, a rare earth element nitrate, a rare earth element sulfate, a rare earth element phosphate, hydrates thereof, or combinations thereof.

The method 200 includes disposing coal, coal by-product(s), and/or coal-derived product(s) 102 in a reactor, unit, column, or vessel (e.g., reactor 105 or supercritical $CO_2$ extraction unit 155) at operation 210. Here, the coal, coal by-product(s), and/or coal-derived product(s), whether treated or untreated and/or milled or un-milled, can be fed to the reactor 105 or supercritical $CO_2$ extraction unit 155 by any suitable apparatus such as a lock hopper and/or a screw feeder. The coal, coal by-product(s), and/or coal-derived product(s) 102 can be suspended in water or other suitable liquid.

The method 200 further includes introducing $CO_2$ to the reactor, unit, column, or vessel (e.g., reactor 105 or supercritical $CO_2$ extraction unit 155) at operation 220. Here, as an example, liquid and/or gaseous $CO_2$ can be flowed from the $CO_2$ tank 109 and into the reactor 105 via the line 108 or supercritical $CO_2$ extraction unit 155 via the line 158. The liquid and/or gaseous $CO_2$ can be flowed into the reactor 105 or supercritical $CO_2$ extraction unit 155 at a rate of about 0.1 mL/min, to about 10 mL/min, such as from about 1 mL/min to about 5 mL/min, such as from about 2 mL/min to about 4 mL/min. Higher or lower flow rates are contemplated. Before, during, or after the liquid and/or gaseous $CO_2$ is flowed into the reactor 105 or supercritical $CO_2$ extraction unit 155, the reactor 105 or supercritical $CO_2$ extraction unit 155 can be maintained at a temperature (or a temperature range) and at a pressure (or a pressure range) that is suitable for the introduction of liquid and/or gaseous $CO_2$. For example, the reactor 105 or supercritical $CO_2$ extraction unit 155 can be maintained at a temperature of less than about 30° C. and/or a pressure from about 1,000 psi to about 4,000 psi for a suitable time period before, during or after introduction of the liquid and/or gaseous $CO_2$. In some embodiments, the $CO_2$ used for the extraction can be collected from an industrial waste stream.

The method 200 further includes converting the $CO_2$, in its liquid and/or gaseous state, to supercritical $CO_2$ and introducing the supercritical $CO_2$ with the coal, coal by-products, and/or coal-derived products, to form a mixture at operation 230. The supercritical $CO_2$ acts as, e.g., a solvent and a Lewis acid for extracting a rare earth element. Further, its low viscosity and high diffusivity, allows it to penetrate the coal particles.

For operation 230, the reactor 105 or supercritical $CO_2$ extraction unit 155 is operated under conditions effective for the conversion from the liquid and/or gaseous $CO_2$ into supercritical $CO_2$ and under conditions effective to extract at least a portion of the rare earth elements from the coal sample. These conditions include a pressure (or pressure range) and a temperature (or a temperature) at or above the critical point for $CO_2$. For example, the conditions of operation 230 can include a pressure of about 900 psi or more and/or about 4,000 psi or less, such as from about 1,000 psi to about 3,000 psi, such as about 1,050 psi to about 2,000 psi, such as from about 1,100 psi to about 1,500 psi. Higher or lower pressures are contemplated. The conditions of operation 230 can further include operating the reactor 105 or supercritical $CO_2$ extraction unit 155 at a temperature of about 200° C. or less, such as about 150° C. or less, such as about 100° C. or less, such as from about 20° C. to about 50° C., such as from about 25° C. to about 45° C., such as from about 30° C. to about 35° C. In some embodiments, operation 230 is performed at a temperature of about 50° C. to about 200° C., such as from about 75° C. to about 175° C., such as from about 100° C. to about 150° C. or from about 125° C. to about 175° C. Higher or lower temperatures are contemplated.

The coal, coal by-product(s), and/or coal-derived product(s) 102 and the supercritical $CO_2$ are mixed, stirred, or otherwise agitated at these operating conditions for a suitable time period such as about 1 minute (min) or more and/or about 24 hours (h) or less, such as from about 10 min to about 20 h, such as from about 30 min to about 10 h, such as from about 1 h to about 5 h, such as from about 2 h to about 4 h. Longer or shorter periods of time are contemplated. During operation 230, the coal, coal by-product(s), and/or coal-derived product(s) 102 are introduced with the supercritical $CO_2$, such that the supercritical $CO_2$ contacts the coal, coal by-product(s), and/or coal-derived product(s) 102 form a mixture under the conditions described above. The conditions of operation 230 are effective to separate, leach, or otherwise remove one or more leachates or materials (e.g., ion(s), metal(s), complex(es) containing a rare earth element, coordination compound(s) containing a rare earth element, composition(s) containing a rare earth element, or combinations thereof). Separation of these and other leachates or other materials can be performed before, during, or after operation 230. Such separation can be performed by filtering, precipitation, crystallization, and/or other suitable methods.

The coal, coal by-product(s), and/or coal-derived product(s) 102 are then introduced with an acid, such as an inorganic acid and/or an organic acid, at operation 240. Operation 240 can be performed in the reactor 105 or the liquid-liquid extraction unit 157. Here, the coal, coal by-product(s), and/or coal-derived product(s) 102 may be in the form of a mixture with the supercritical $CO_2$ when the acid is introduced during operation 240. Additionally, or alternatively, supercritical $CO_2$ may be at least partially removed from the reactor 105 or the liquid-liquid extraction unit 157 prior to introduction with the acid.

Operation 240 is performed under conditions effective to form one or more leachates or materials (e.g., ion(s), metal(s), complex(es) containing a rare earth element, coordination compound(s) containing a rare earth element, composition(s) containing a rare earth element, or combinations thereof). A first material can be removed using a first acid, a second material can be removed using a second acid, and an nth material can be removed using an nth acid (where n=3, 4, 5, 6, 7, or more). Each of the first, second, and nth acids can be, independently, the same or different.

The acid(s) utilized for operation 240 can include an inorganic acid, an organic acid, or a combination thereof. Illustrative, but non-limiting, examples of inorganic acids include HCl, $H_2SO_4$, $HNO_3$, HBr, HI, $H_3PO_4$, Lewis acids (e.g., $FeCl_3$), or combinations thereof. Illustrative, but non-limiting, examples of organic acids include $C_1$-$C_{25}$ carboxylic acid, such as a $C_3$-$C_{10}$ carboxylic acid, such as a $C_3$-$C_7$ carboxylic acid, such as oxalic acid, citric acid, formic acid, lactic acid, acetic acid, uric acid, malic acid, tartaric acid, trifluoroacetic acid, or combinations thereof. Additionally, or alternatively, sulfonic acids such as $C_1$-$C_{25}$ sulfonic acid, such as a $C_3$-$C_{10}$ sulfonic acid, such as a $C_3$-$C_7$ sulfonic acid, such as trifluorosulfonic acid, trifluodosulfonic acid, or combinations thereof can be utilized.

These acids can leach the one or more rare earth elements or materials containing the one or more rare earth elements from the coal, coal by-product(s), and/or coal-derived product(s) with high selectivity and/or lower amounts of undesired cations and anions. Further, acids such as formic acid are also bio-renewable and readily available as a waste product generated from biomass and other processes.

The acid utilized for operation 240 can be at any suitable concentration in a suitable solvent (e.g., water and/or an alcohol such as ethanol, or another solvent that effectively dissolves the acid(s)) such as about 0.1% w/w or more and/or about 40% w/w or less, such as from about 0.25% w/w to about 20% w/w, such as from about 0.5% w/w to about 10% w/w, such as from about 0.75% w/w to about 8% w/w, such as from about 1% w/w to about 5% w/w, such as from about 1.5% w/w to about 4% w/w, such as from about 2% w/w to about 3.5% w/w, such as from about 2.5% w/w to about 3% w/w. Higher or lower concentrations can be utilized. Operation 240 can be performed at a pressure of about 10 psi or more or about 300 psi or less, such as from about 15 psi to about 200 psi, such as from about 20 psi to about 100 psi, such as from about 25 psi to about 50 psi, and/or a temperature of about 15° C. or more or about 200° C. or less, such as from about 20° C. to about 150° C., such as from about 25° C. to about 100° C., such as from about 30° C. to about 50° C., such as from about 35° C. to about 45° C. In at least one embodiment, operation 240 can be performed at a pressure from about 10 psi to about 30 psi and/or a temperature of about 15° C. to about 25° C. Higher or lower pressures and/or temperatures for operation 240 are contemplated. The coal, coal by-product, and/or coal derived-product(s), with or without $CO_2$, can be mixed, stirred, or otherwise agitated for a suitable time period such as for about 1 min or more or about 24 h or less, such as from about 10 min to about 20 h, such as from about 30 min to about 10 h, such as from about 1 h to about 5 h, such as from about 2 h to about 4 h. Longer or shorter periods of time are contemplated.

Operation 240 can be performed one or more times with filtration before or after one or more of the acid extractions. For example, the mixture of first acid and ash can be filtered to obtain a first filtrate and ash. A second acid, which can be the same or different as the first acid, can then be combined with the ash, and a second filtrate and ash can be collected. In at least one embodiment, the acid can be recovered or recycled and re-used in the method 200.

At operation 250, the mixture formed in operation 240 can be subjected to separation conditions to obtain the one or more rare earth elements. Additionally, or alternatively, the mixture formed in operation 230 can be subjected to separation conditions to obtain the one or more rare earth elements. The separation conditions separate, remove, extract, or otherwise isolate the one or more leachates and/or materials from the mixture. Such separation can be performed by filtering, precipitation, crystallization, coagulation, and/or other suitable methods. Here, for example, a rare earth element or material containing a rare earth element is separated from one or more metals such as Al, Fe, Ca, Na, Si, Mg, Zn, Cu, Ti, other undesired metals, impurities, or combinations thereof.

In some embodiments, and after operation 230 and/or operation 240, the at least one rare earth element can be solubilized into a solution and can be found as a soluble ion, associated to chlorine, sulfate, nitrate, a hydrate, a hydroxide, an oxide, an oxalate, a citrate, and/or other counter ion depending on the acid(s) utilized. Filtration, precipitation, crystallization, coagulation, and/or other suitable operations can be performed on this solution to obtain the one or more rare earth elements.

As another example, a metal such as Al, Fe, Ca, Na, Si, Mg, Zn, Cu, Ti, other undesired metals, impurities, or combinations thereof, can be removed from the coal, coal by-product(s), and/or coal-derived product(s) 102 in the form of, e.g., an ion, a complex, a coordination compound, and/or a composition with other materials. These undesired metals and impurities can be solubilized into a solution and can be found as a soluble ion, associated to chlorine, sulfate, nitrate, a hydrate, a hydroxide, an oxide, an oxalate, a citrate, and/or other counter ion depending on the acid(s) utilized.

In at least one embodiment, the at least one rare earth element can be precipitated in operation 250 by, e.g., adjusting the pH of the solution containing the at least one rare earth element to a pH from about 1 to about 8, such as from about 2 to about 6, such as from about 3 to about 5. In some examples, the pH of the solution can be adjusted to a pH from about 5 to about 7. Base(s) can be used to increase the pH of the solution. The base(s) can include KOH, NaOH, $Ca(OH)_2$, CaO, MgO, $Mg(OH)_2$, $CaCO_3$, $Na_2CO_3$, $NaHCO_3$, $CO_2$, or combinations thereof at suitable concentrations. Acid(s) such as those described above such as oxalic acid, citric acid, formic acid, lactic acid, acetic acid, uric acid, malic acid, tartaric acid, other acids, or combinations thereof can be utilized to precipitate the at least one rare earth element before, during, and/or after adding a base. Alternatively, no base is added before precipitation with acid.

For precipitation, the concentration of acid in solution (e.g., aqueous solution) can be from about 0.025 mmol/L to about 50 mmol/L, such as from about 0.05 mmol/L to about 10 mmol/L, such as from about 0.1 mmol/L to about 5 mmol/L such as from about 0.5 mmol/L to about 4 mmol/L, such as from about 1 mmol/L to about 3 mmol/L or from about 1 mmol/L to about 2 mmol/L. Higher or lower concentrations are contemplated.

The one or more rare earth elements recovered from operation 250 can be in the form of, e.g., ion(s), metal(s), complex(es) containing a rare earth element (e.g., a rare earth element oxide, an rare earth element oxalate, an rare earth element citrate, and/or other rare earth element complexed or bonded to an organic acid, organic acid ion, inorganic acid, inorganic acid ion), coordination compound(s) containing a rare earth element, composition(s) containing a rare earth element, or combinations thereof. Other materials that can be recovered include a rare earth element halide, a rare earth element hydrate, a rare earth element nitrate, a rare earth element sulfate, a rare earth element phosphate, hydrates thereof, and combinations thereof.

Various operations of the method 200 can be performed, independently, more than once. The order of operations of the method 200 can be altered if desired.

According to at least one embodiment, a method for separating at least one rare earth element from coal, coal by-product, and/or coal-derived product can include one or more of the following operations:

(a) extracting coal ash with supercritical $CO_2$;
(b) extracting the mixture of coal ash and supercritical $CO_2$ with an acid, filtering the mixture formed from (a) to retrieve solids and leaching the solids with an acid, and/or filtering the mixture formed from (a) to retrieve liquids and extracting the liquids with an acid;
(c) if desired, repeating operations (a) and/or (b) one or more times, where the supercritical $CO_2$ and/or the acid utilized for operation (c) is the same or different as those utilized in operation (b);
(d) removing one or more materials comprising a metal that is not a rare earth element (e.g., Al, Fe, Ca, Na, Si, Mg, Zn, Cu, Ti, or combinations thereof) before, during, and/or after operations (a), (b), and/or (c) by precipitation, filtration, extraction, isolation, and/or other suitable methods;
(e) removing one or more leachates or materials comprising a rare earth element before, during, and/or after operations (a), (b), (c), and/or (d) by precipitation, filtration, extraction, isolation, and/or other suitable methods.

In some embodiments, the one or more leachates or materials that can be in the form of a solution are precipitated, filtered, extracted, or isolated by methods described herein can be heated and/or calcined at a suitable temperature to, e.g., remove undesired materials such as carbon. The temperature for heating and/or calcination can be about 500° C. or more and/or about 1200° C. or less, such as from about 600° C. to about 1100° C., such as from about 700° C. to about 1000° C., such as from about 800° C. to about 950° C., such as from about 850° C. to about 900° C. or from about 875° C. to about 925° C. Higher or lower temperatures are contemplated. After calcination, an REE oxide, a composition comprising an REE oxide, or both, can be obtained.

In some embodiments, the one or more leachates or materials that can be in the form of a solution are coagulated with a coagulation solution cyclically to remove undesired materials such as Ca, Mg, K, Na, Al, Si, Fe, other undesired materials, or combinations thereof. The coagulation solution can be an aqueous alkaline solution of $NH_4OH$, $Na_2CO_3$, $NaHCO_3$, or combinations thereof. The coagulation solution can be added to the one or more leachates or materials such that the pH of the resulting solution is from about 5 to about 7 as measured by a pH meter. Coagulation can be performed one or more times such as 1, 2, 3, 4, 5, or more times. After one or more of the coagulations, the mixture formed can be separated or filtered to remove impurities.

Here, for example, the impurities are removed in a step-wise manner to remove a portion of the purities in one cycle (coagulation plus filtration), remove a second portion in a second cycle (coagulation plus filtration), and so forth. Impurities removal by, e.g., coagulation can be performed at a pH of about 5 to about 7. A lower or higher pH is contemplated.

After removal of the undesired materials, one or more rare earth elements can be precipitated and calcined as described above to form the one or more REE oxides.

Figure 3:
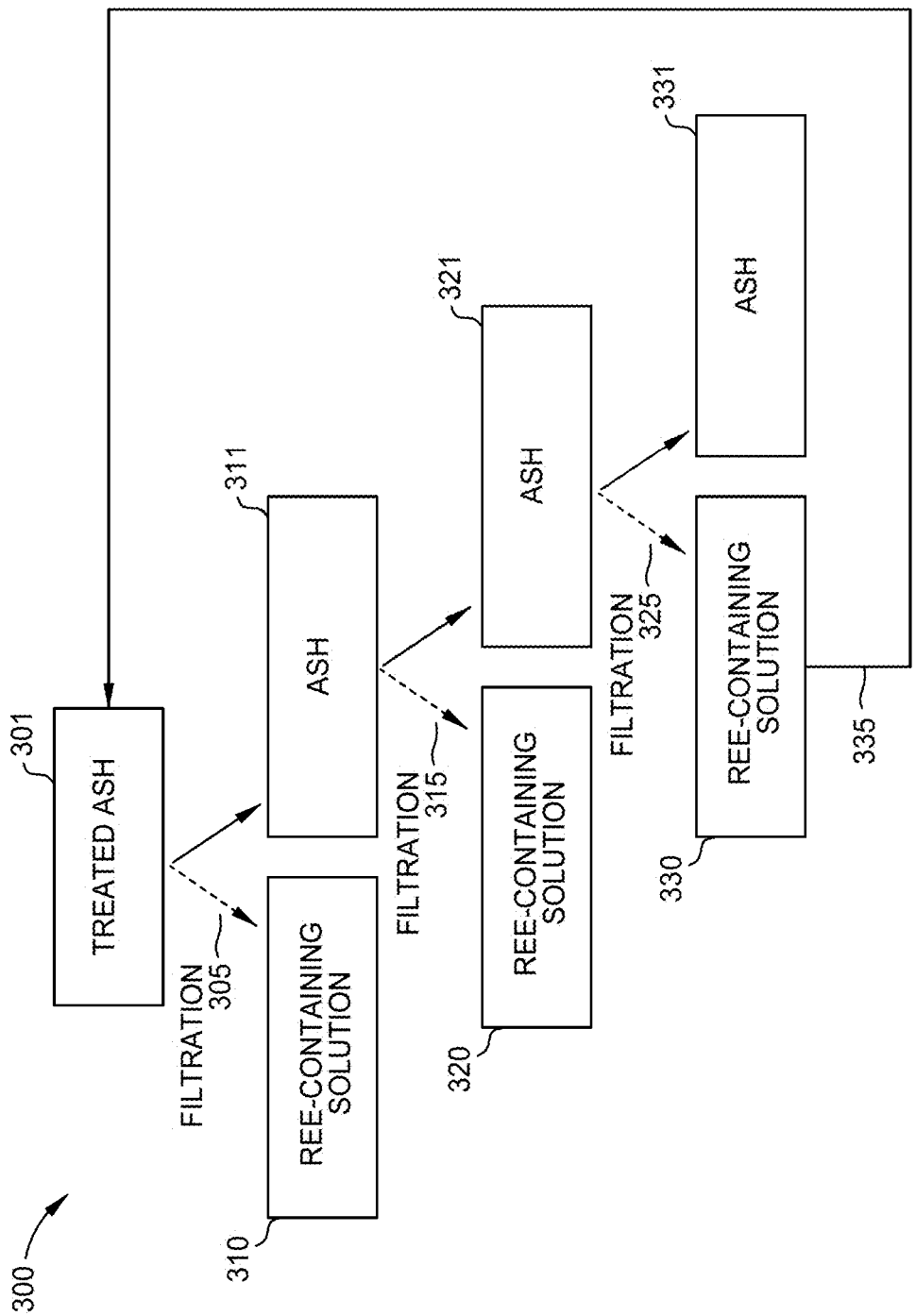
FIG. 3 is a schematic diagram of an example REE separation method according to at least one embodiment of the present disclosure.

FIG. 3 is a schematic diagram of an example rare earth element separation method 300 that can be performed after extraction with supercritical $CO_2$ and/or acid. The acids utilized for method 300 can be one or more of those acids described above, for example, the organic acids and/or inorganic acids. The method begins with the treated coal, coal by-product(s), and/or coal-derived product(s), such as first treated ash 301 (e.g., the ash treated with supercritical $CO_2$ and/or acid). A first acid is added to the first treated ash 301 and the resulting mixture is mixed, stirred, or otherwise agitated under first conditions. The first conditions can include those conditions, e.g., temperature, pressure, and time period, described above with respect to operation 240. After a sufficient time period, the mixture is filtered at operation 305 to obtain a first rare earth element-containing solution 310 and ash 311. Filtering at operation 305 can be performed by any suitable method such as mechanical filtration, vacuum filtration, centrifugal filtration, gravity filtration, multi-layer filtration, and combinations thereof. A second acid is added to the ash 311 and the resulting mixture is mixed, stirred, or otherwise agitated under second conditions. The second conditions can include those conditions, e.g., temperature, pressure, and time period, described above with respect to operation 240. After a sufficient time period, the mixture is filtered, by e.g., those suitable methods described above, at operation 315 to obtain a second rare earth element-containing solution 320 and ash 321. A third acid is added to the ash 321 and the resulting mixture is mixed, stirred, or otherwise agitated under third conditions. The third conditions can include those conditions, e.g., temperature, pressure, and time period, described above with respect to operation 240. After a sufficient time period, the mixture is filtered by e.g., those suitable methods described above, at operation 325 to obtain a third rare earth element-containing solution 330 and ash 331.

In at least one embodiment, the third rare earth element-containing solution 330 generated from the first treated ash 301 can be utilized as the acid for the first acid extraction of a second treated ash (e.g., a newly generated sample) as shown by numeral 335. Method 300 enables a near-zero emission extraction method of treated coal, a treated coal by-product, and/or a treated coal-derived product.

In some embodiments, the methods described herein can concentrate rare earth elements from about 0.01 wt % based on an amount of REEs in the starting coal, coal by-product, and/or coal-derived product to a final product having greater than about 85 wt % or more, about 90 wt % or more, such as about 95 wt % or more, such as about 99 wt % or more rare earth element(s). The percentages here are calculated by the total amount of REE oxides (wt %) divided by the final product comprising the REE oxides. For example, the methods described herein can concentrate one or more rare earth elements in ash from 312 ppm to 99.4 wt % in the final product.

Relative to conventional methods for recovering rare earth elements from coal, coal by-product(s), and/or coal-derived product(s) (e.g., coal ash, overburden, etc.), the methods described herein can achieve about 80% or higher rare earth element recovery, with a reduction in energy consumption of about 50% or more, cost reductions of about 30% or more, and generating near-zero pollution.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (e.g. amounts, dimensions, etc.) but some experimental errors and deviations should be accounted for.

EXAMPLES

Various examples described herein utilize ash from Iowa, North Dakota, Utah, Wisconsin, and Wyoming.

Extraction efficiency refers to the percentage of REEs extracted by supercritical $CO_2$ and/or acid divided by the total REEs in coal ash.

Separation efficiency refers to the removal of REEs that are already recovered in the extraction solution from the coal ash (e.g., after supercritical $CO_2$ and/or acid extraction) as measured using ICP-MS.

Recovery efficiency was calculated using (total REEs in extract/total REEs in ash×100) %. REEs in the extract was determined using ICP-MS; REEs in the ash is fused with lithium metaborate under 1100° C. and dissolved in 5% nitric acid before determination by ICP-MS. ICP-MS gives the concentrations of individual REEs. The amount of individual REEs is calculated by concentration×volume. Total REEs is the sum of the amounts of each REEs.

1. Experimental Set-Up and Materials

Figure 4A:
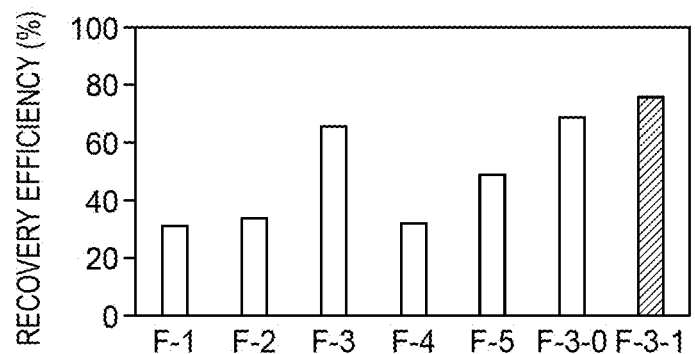
FIG. 4A shows exemplary data for the recovery efficiency of a rare earth element from coal fly ash achieved using an example method described herein.

FIG. 4A is a photograph of an example lab-scale extraction system for separating rare earth elements from coal, coal by-products, and/or coal-derived product(s). The rare earth element extraction system includes a liquid $CO_2$ cylinder (99.99%, with a dip tube inside), a cylinder heating jacket (with maximum heating temperature at about 238° F.), a SFT-10 $CO_2$ pump from Supercritical Fluid Technologies Co. (with a pressure delivery range of 0 to 10,000 psi and a flow rate range of 0.01 to 24.00 mL/min). The extraction system further includes a high pressure reactor (including a heating furnace, a 100 mL vessel, a SFT-mag drive mixer from Supercritical Fluid Technologies Co., a pressure gauge with a maximum pressure of 10,000 psi, inlet/outlet valves, a back pressure regulator, and a rupture disc), and a RxTrol B Controller from Supercritical Fluid Technologies Co. (including a vessel heater, two temperature sensors for reactor wall/interior mounting, an open loop agitator, and a speed controller).

A different lab-scale $CO_2$ extraction set-up, not shown, can include a liquid $CO_2$ cylinder (99.99%, with a dip tube inside), a high pressure generator (Parr Instrument Company, Model 87-6-5, with a pressure delivery range of 0 to 5,000 psi and a flow rate range of 0.01 to 60.00 mL/min). This extraction set-up also includes a high pressure reactor (including a heating plate, a 100 mL Teflon vessel, a pressure gauge with a maximum pressure of 5,000 psi, a vessel heater with a maximum temperature of 350° C., inlet/outlet valves, and a rupture disc).

Figure 4B:
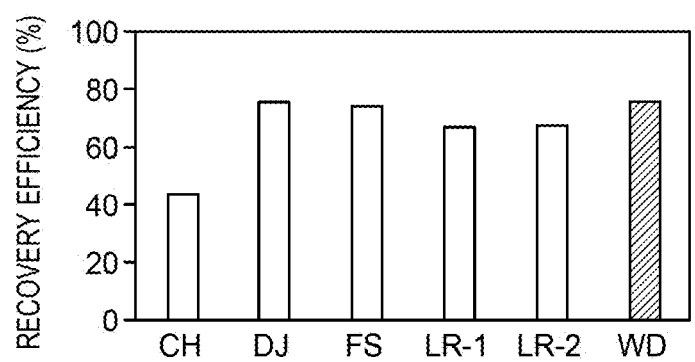
FIG. 4B shows exemplary data for the recovery efficiency of a rare earth element from coal fly ash achieved using another example method described herein.

FIG. 4B is a photograph of an example high temperature furnace (up to 3,000° C.), manufactured by Materials Research Furnace Inc. that can be used with embodiments described herein. The high temperature furnace can be used for de-watering and thermal decomposition of the materials exiting the extraction system shown in FIG. 4A.

Inductively coupled plasma mass spectrometry (ICP-MS). The concentrations of rare earth elements and other inorganic elements in original coal fly ashes, extraction solutions, and rare earth element-containing solids were determined using Inductively coupled plasma mass spectrometry (ICP-MS). ICP-MS analysis was performed using a Perkin Elmer NexION® 300S.

The surface area of the ash samples were determined by the Brunauer, Emmet, Teller (BET) analytical technique using a Quantachrome Autosorb-iQ instrument BET surface area analyzer.

The organic carbon content of the samples were determined using a Vario MACRO Cube elemental analyzer.

Tables 1, 2A, and 2B show example characteristics of various coal ash samples used for the separation method described herein. The coal ash samples were obtained from various power plants/stations including Cherokee station (CH), Dave Johnston station (DJ); Dry Fork station (FS); JEA station (JE), and Laramie River station (LR), and Wyodak station (WD). The coal ash samples LR-1 and LR-2 designate samples received at different times from Laramie River Station. The amounts of carbon, hydrogen, nitrogen, and sulfur were determined by ICP-MS.

TABLE 1

| Ash Sample | Carbon, wt % | Hydrogen, wt % | Nitrogen, wt % | Sulfur, wt % |
|---|---|---|---|---|
| CH | 0.88 | 0.21 | 0.03 | 4.19 |
| DJ | 0.89 | 0.82 | 0.06 | 5.58 |
| FS | 1.8 | 0.31 | 0.03 | 3.41 |
| JE | 0.52 | 0.01 | 0.02 | 1.28 |
| LR | 0.26 | 0.25 | 0.02 | 0.91 |
| WD | 0.56 | 0.24 | 0.04 | 3.5 |

TABLE 2A

| Ash Sample | Surface Area, $m^2/g$ |
|---|---|
| CH | 1.734 |
| DJ | 13.743 |
| FS | 5.990 |
| JE | 0.076 |
| LR | 0.905 |
| WD | 19.320 |

TABLE 2B

| Ash Sample | Moisture, wt % | Organic carbon, wt % |
|---|---|---|
| CH | 0.41 | 1.91 |
| DJ | 6.54 | 4.26 |
| FS | 0.84 | 2.91 |
| LR-1 | 0.37 | 0.61 |
| LR-2 | 0.08 | 0.43 |
| WD | 1.23 | 3.08 |

As shown in Table 2A, the surface area of the ash samples are varied. Surface area of the ash can have an implication on the extraction because a higher surface area implies a higher chance of collisions in a reaction and a more efficient extraction.

Table 3 shows the concentration of various rare earth elements in several different fly ash samples on a dry ash basis (DAB) prior to separation from the coal ash as determined by ICP-MS.

TABLE 3

| | Concentration, ppm | | | | | |
|---|---|---|---|---|---|---|
| Element | CH | DJ | FS | LR-1 | LR-2 | WD |
| Ce | 170.1 | 148.9 | 153.5 | 159.7 | 171.1 | 167.5 |
| Dy | 11.0 | 12.8 | 14.2 | 11.9 | 14.9 | 15.6 |
| Er | 7.0 | 7.4 | 8.3 | 7.4 | 9.0 | 8.9 |
| Eu | 3.6 | 4.7 | 5.3 | 3.8 | 5.8 | 5.4 |
| Gd | 14.4 | 16.5 | 22.4 | 15.2 | 22.4 | 23.6 |
| Ho | 2.2 | 2.5 | 2.8 | 2.4 | 2.9 | 3.0 |
| La | 90.7 | 79.5 | 77.6 | 86.9 | 89.0 | 87.0 |
| Lu | 1.2 | 1.1 | 1.2 | 1.2 | 1.3 | 1.2 |
| Nd | 101.9 | 96.0 | 102.6 | 98.5 | 109.3 | 111.1 |
| Pr | 23.5 | 18.1 | 23.7 | 22.6 | 24.8 | 25.4 |
| Sm | 15.1 | 16.9 | 23.1 | 15.4 | 23.8 | 24.0 |
| Tb | 1.9 | 2.2 | 2.5 | 2.0 | 2.5 | 2.7 |
| Tm | 1.1 | 1.1 | 1.2 | 1.1 | 1.3 | 1.2 |
| Y | 61.8 | 65.5 | 72.2 | 68.6 | 76.8 | 76.4 |
| Yb | 6.9 | 6.8 | 7.4 | 7.1 | 8.2 | 7.8 |
| Total REEs, ppm | 512.4 | 480.2 | 517.8 | 503.6 | 563.1 | 561.0 |

2. Example Results from Leaching

A number of acids including, but not limited to, inorganic acids, organic acids, and acid mixtures were investigated for the leaching of rare earth elements from coal ashes. In some examples, up to about 88% of the rare earth elements were recovered in solution from coal ash based on the total amount of rare earth elements of the coal ash sample extracted. This is calculated based on the total REE (wt %) in the extraction solution (e.g., the solution after extraction with supercritical $CO_2$ and/or acid prior to precipitation, coagulation, etc.) divided by the total REE (wt %) in the coal ash used for the extraction. Total REE (wt %) in the extraction solution, and total REE (wt %) in the coal ash was determined by ICP-MS as described above.

The acid-leaching ability is been greatly improved with the use of supercritical $CO_2$ and showed much better performance on overall rare earth element extraction than leaching by acids alone. For example, when using formic acid alone, the extraction efficiency was about 65.5%. When using formic acid at the same concentration and with supercritical $CO_2$, the extraction efficiency was about 75.5%.

Figure 4C:
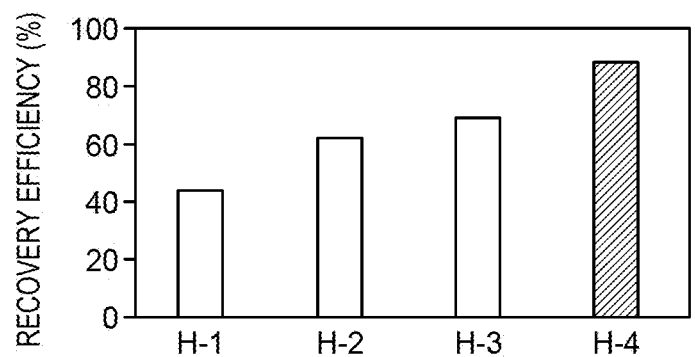
FIG. 4C shows exemplary data for the recovery efficiency of a rare earth element from coal fly ash achieved using another example method described herein.

FIGS. 4A-4C show exemplary data for the separation of rare earth elements from coal fly ashes of various sources under different conditions. The data illustrates that rare earth elements can be recovered from coal fly ash with good to very high recovery efficiency. In FIG. 5A, F-1 refers to 5% formic acid; F-2 refers to 10% formic acid; F-3 refers to 20% formic acid; F-4 refers to 30% formic acid; F-5 refers to 40% formic acid; F-3-0 refers to 20% formic acid, supercritical $CO_2$, 35° C.; and F-3-1 refers to 20% formic acid, supercritical $CO_2$, 50° C. In FIG. 4B, the conditions for recovery were supercritical $CO_2$ (1,000 psi, 50° C.)+HCl (2%). In FIG. 4C, H-1 refers to 5% HCl; H-2 refers to 10% HCl; H-3 refers to 20% HCl; and H-4 refers to 37% HCl.

Figure 4D:
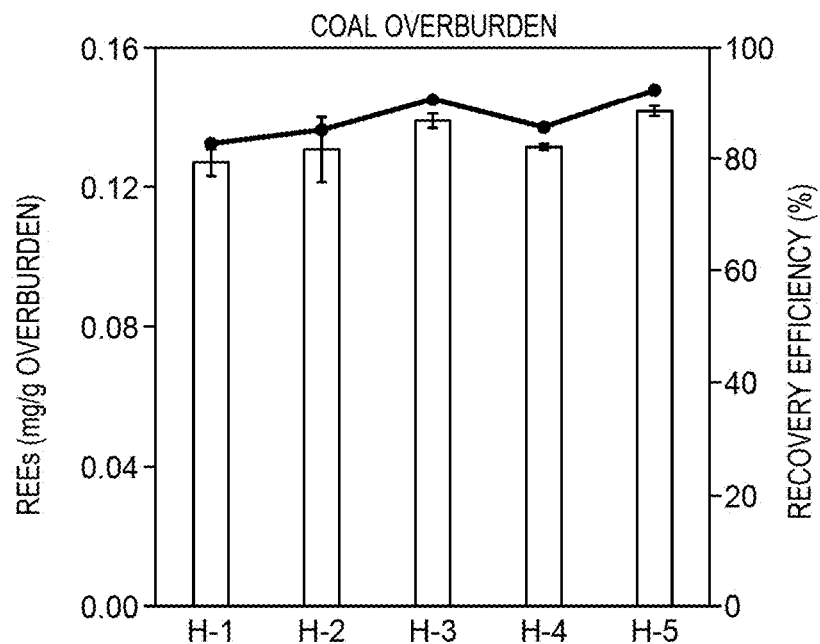
FIG. 4D shows exemplary data for the recovery efficiency of a rare earth element from coal overburden using another example method described herein.

FIG. 4D shows exemplary data for the separation of rare earth elements from coal overburden sourced from Wyodak. The concentration of rare earth elements in the coal overburden was typically about 150 ppm rare earth elements. In FIG. 4D, H-1 refers to 1% HCl; H-2 refers to 2% HCl; H-3 refers to 4% HCl; H-4 refers to 8% HCl, and H-5 refers to 10% HCl. No supercritical $CO_2$ was utilized. The data illustrates that the extraction method described herein can be used for coal overburden, with a rare earth element extraction efficiency of about 83-93%. Moreover, the conditions for extracting rare earth elements from coal overburden can be milder than those conditions for coal ash.

Figure 4E:
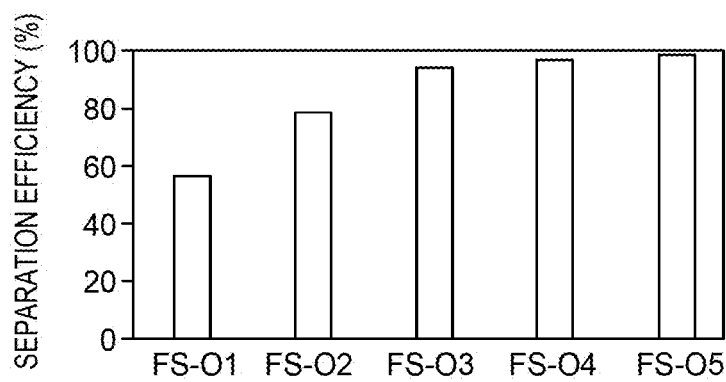
FIG. 4E shows exemplary data for the separation efficiency of rare earth elements from a solution using an example method described herein.
Figure 4F:
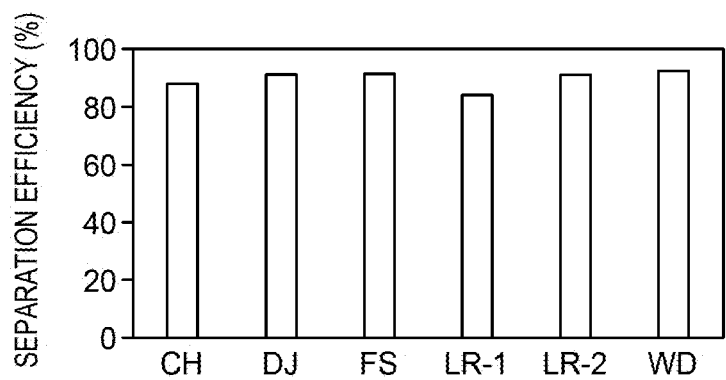
FIG. 4F shows exemplary data for the separation efficiency of rare earth elements from a solution using an example method described herein.

FIG. 4E shows exemplary data for the separation efficiency of rare earth elements from solutions. The solutions included dissolved rare earth elements after acid extraction. In this experiment, the solutions were precipitated with various concentrations of oxalic acid. FS-01 refers to 0.1 mmol/L; FS-02 refers to 0.5 mmol/L; FS-03 refers to 1 mmol/L; FS-04 refers to 2 mmol/L; and FS-05 refers to 4 mmol/L. FIG. 4F shows exemplary data for the separation efficiency of rare earth elements from solutions. The solutions included dissolved rare earth elements after acid extraction. The solutions were formed from acid extraction of various coal ash samples. In this experiment, the solutions were precipitated with oxalic acid (1 mmol/L).

Table 4 shows the separation efficiency for various conditions for separating rare earth elements from coal and coal-derived products for eight different conditions. The coal ash used for this experiment was from Dry Fork station (FS) and Cherokee station (CH). The concentration of formic acid solution utilized for the extraction was varied between about 5% and about 40%. Conditions 1-6 included precipitation without sequential impurity removal. Condition 7 refers to the product from condition 6 being submitted to one cycle of impurity removal. Condition 8 refers to the product from condition 7 being submitted to another cycle of impurity removal. The percentage of REEs in product (% REEs in product) was determined by dividing the total amount of REEs in the product (wt %) by the total amount of product (i.e., REEs plus impurities). The REE products (REE oxides+impurity) were dissolved in an acid solution prior to ICP-MS measurement to determine individual REE ion concentrations. REE ion concentrations were used to back calculate REE element mass in the product. The numbers present here were calculated by (total REE element Wt./REE product Wt.).

TABLE 4

| Condition | Coal Ash | Formic Acid | % REEs in product (REE-containing solids) |
|---|---|---|---|
| 1 | FS | 5% | 2.1 |
| 2 | FS | 10% | 3.5 |
| 3 | FS | 20% | 2.7 |
| 4 | FS | 30% | 3.7 |
| 5 | FS | 40% | 6 |
| 6 | CH | 10% | 7.6 |
| 7 | CH | 10% | 8.2 |
| 8 | CH | 10% | 10.8 |

The data in Table 4 indicates that the amount of rare earth elements in the products can be depend on the coal ash used and/or the extraction conditions utilized. The data also indicates that impurities can be removed cyclically (e.g., coagulation plus filtration, or precipitation plus filtration, etc.).

3. Example Extraction Procedure Using HCl

Figure 5:
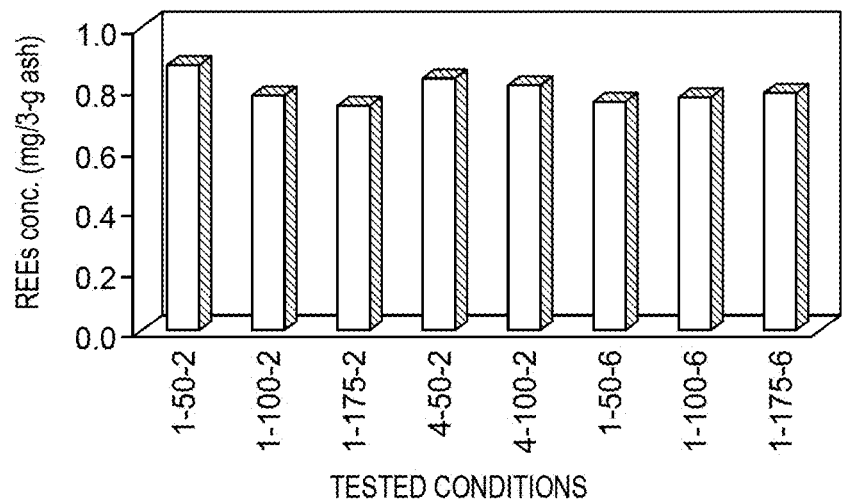
FIG. 5 is a bar graph showing the concentration of rare earth element versus extraction conditions of temperature, initial $CO_2$ pressure, and duration according to at least one embodiment of the present disclosure.

The following is a non-limiting example method using 2% w/w HCl solution to extract rare earth elements from coal ash. A loading ratio of about 3 grams ash per 30 mL of nano-pure water was utilized. The ash-water mixture was placed in the chemical reactor. Liquid $CO_2$ was then was pumped into the reactor at a rate of about 2.5 mL/min after it was sealed to an initial pressure of about 1,000 or about 4,000 psi at ambient temperature (~25° C.). When the temperature reached the set point, the pressure was higher; and as $CO_2$ dissolved, the pressure dropped gradually and stabilized when the extraction system is saturated with $CO_2$. Eight different supercritical $CO_2$ extraction conditions were then examined as shown in FIG. 5. After the supercritical $CO_2$ extraction, the samples were subsequently filtered and leached with ~2% w/w HCl for five operations (5 aliquots of ~2% w/w HCl), and the amount of REEs extracted from 3 g of coal ash for each test condition are reported.

In FIG. 5, the numbers associated with each sample represent the tested condition of supercritical $CO_2$. For example, 1-50-2 refers to the tested condition of 1,000 psi initial pressure, ~50° C., and ~2 h extraction time with supercritical $CO_2$. As another example, 4-100-2 refers to the tested condition of ~4,000 psi initial pressure, ~100° C., and ~2 h extraction time with supercritical $CO_2$. Thus, the tested conditions included extraction temperatures of about 50° C., about 100° C., or about 175° C.; an initial pressure of about 1,000 psi or about 4,000 psi, and an extraction time of about 2 h or about 6 h.

Table 5 shows the results of extracting coal ash from various sources using with supercritical $CO_2$ followed by extraction with 2% w/w HCl (five times). The results are reported as "as received", "dry mass basis" (DMB) and "dry ash basis" (DAB). "As received" refers to the coal ash composed of ash, organic residues, and moisture. DMB refers to the coal ash composed of ash and organic residues, and DAB refers to the coal ash composed of ash without moisture and organic residues. The values in Table 5 are then calculated based on the REE (wt) recovered using the method divided by as received coal ash (wt), the DMB (wt), or the DAB (wt).

TABLE 5

Recovered Rare Earth Elements from Coal Ash Samples

| | Lanthanides + Y | | | Lanthanides only | | |
|---|---|---|---|---|---|---|
| Ashes | As received (ppm) | DMB (ppm) | DAB (ppm) | As received (ppm) | DMB (ppm) | DAB (ppm) |
| CH | 219.8 | 220.8 | 225.0 | 191.4 | 192.2 | 195.9 |
| DJ | 324.8 | 347.6 | 363.1 | 276.0 | 295.3 | 308.5 |
| FS | 368.2 | 371.3 | 382.4 | 311.1 | 313.8 | 323.2 |
| LR-1 | 334.1 | 335.3 | 337.4 | 287.0 | 288.0 | 289.8 |
| LR-2 | 376.4 | 376.7 | 378.3 | 323.1 | 323.3 | 324.7 |
| WD | 404.4 | 409.5 | 422.5 | 340.0 | 344.2 | 355.2 |

It was found that the second acid extraction can be the most effective extraction and can generate the most concentrated solution of rare earth elements, followed by the third acid extraction. In some examples, the first, fourth and fifth acid extractions may not be as effective. It is believed that the extraction conditions, such as temperature, pressure, and duration may have minimal impact on the extraction of rare earth elements. The coal fly ash-water mixture after supercritical extraction can be neutral or alkaline and holds great buffer capacity. The addition of acids both lowers the pH of the coal fly ash-water mixture and aids in solubilizing the rare earth element for extraction from the sample. The results also demonstrated that the acid can be recycled and utilized as at least a portion of the acid in the first acid extraction of a second treated ash (e.g., a newly generated sample), as depicted by numeral 335 in FIG. 3.

While not wishing to be bound by theory, the first acid extraction can be seen as a process of neutralization, e.g., where most of the protons are consumed by the base already present in the coal ash. That is, coal ash typically contains base such as $Ca(OH)_2$. Once the base in the ash is reduced, the acid extractions can be more effective and can provide higher yields for the second acid extraction. For the third acid extraction and/or fourth acid extraction, the amount of extracted rare earth elements can diminish, but the REE-containing solution has most of the acid unconsumed. The REE-containing solution can be recycled for the next cycle of acid extraction, e.g., the third acid extraction and/or fourth acid extraction aliquot can be reused as an acid for the first acid extraction to neutralize the newly generated ashes by exposure to supercritical $CO_2$. Relative to conventional methods, the procedure described herein uses significantly less acid. For example, the amount of acid used for the rare earth element extraction is about 25% lower or about 33% lower than other methods, depending on which extraction aliquot is reused. Moreover, the concentration of rare earth elements in the first acid extraction can be increased because the solution contains rare earth elements from the last acid extraction of the first ash and the first acid extraction of the second ash.

4. Example Recovery Efficiencies

Following supercritical $CO_2$ extraction, the reactor was allowed to cool down to ambient temperature. The valve of the chemical reactor was opened to remove $CO_2$ and the ash-water mixture was collected. The pH of the mixture ranged from about 7.5 to about 10, a condition that can render the rare earth elements insoluble as confirmed by ICP-MS analyses. The mixture was filtered through a 0.45 μm paper filter. The filtrate was discarded and the collected ash was extracted with about 30 mL w/w HCl for five (5) times. The leachate was filtered and collected separately for further concentration or diluted for rare earth element measurement by ICP-MS. The recovery efficiency is shown in Table 6. Total rare earth elements (total REEs) refers to the amount of rare earth elements in the coal ash before treatment as determined by ICP-MS, and the recovered rare earth elements (recovered REEs) refers to the amount of rare earth elements recovered after five acid extractions as determined by ICP-MS. Recovery efficiency is the recovered REEs divided by the total REEs in the original coal ash sample. The values are in DMB.

TABLE 6

Recovery Efficiency (%)

| | Lanthanides + Y | | | Lanthanides only | | |
|---|---|---|---|---|---|---|
| Ash Sample | Recovered REEs, ppm | Total REEs, ppm | Recovery Efficiency % | Recovered REEs, ppm | Total REEs, ppm | Recovery Efficiency, % |
| CH | 219.8 | 500.5 | 43.9 | 191.4 | 440.1 | 43.5 |
| DJ | 324.8 | 429.7 | 75.6 | 276.0 | 371.0 | 74.4 |
| FS | 368.2 | 498.5 | 73.9 | 311.1 | 429.0 | 72.5 |
| LR-1 | 334.1 | 498.7 | 67.0 | 287.0 | 430.7 | 66.6 |
| LR-2 | 376.4 | 560.2 | 67.2 | 323.1 | 483.9 | 66.8 |
| WD | 404.4 | 537.0 | 75.3 | 340.0 | 463.8 | 73.3 |

5. Effect of Supercritical $CO_2$ Treatment on Extraction

Figure 6:
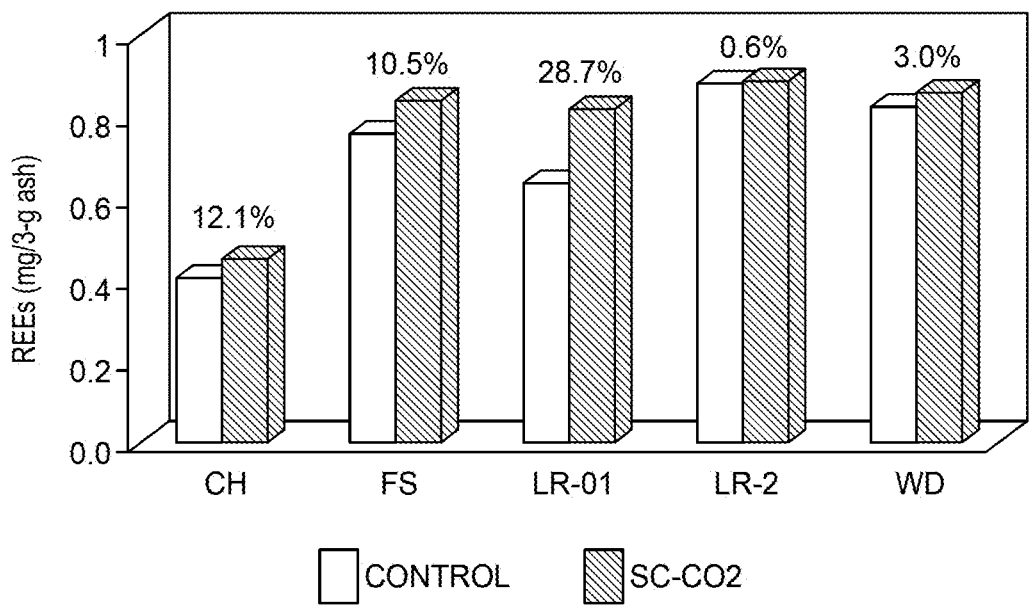
FIG. 6 is a bar graph showing the effect of the example supercritical treatment on the subsequent acid (2% HCl) extraction according to at least one embodiment of the present disclosure.
Figure 7B:
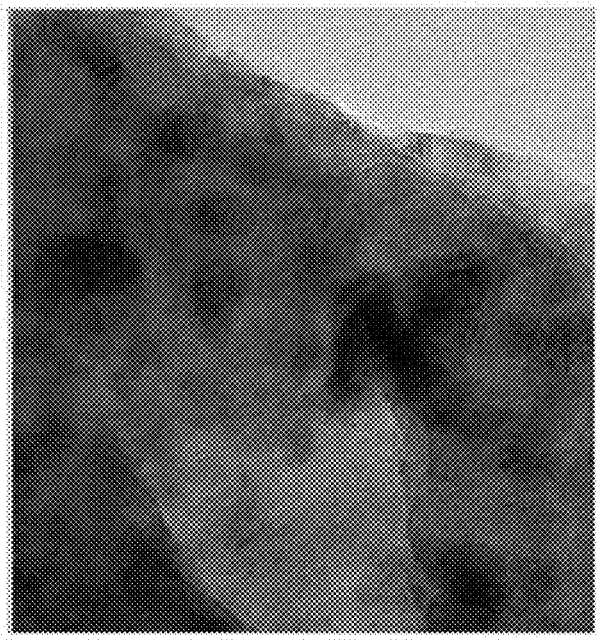
FIG. 7B is a TEM image of an example coal fly ash prior to extraction according to at least one embodiment of the present disclosure.
Figure 7A:
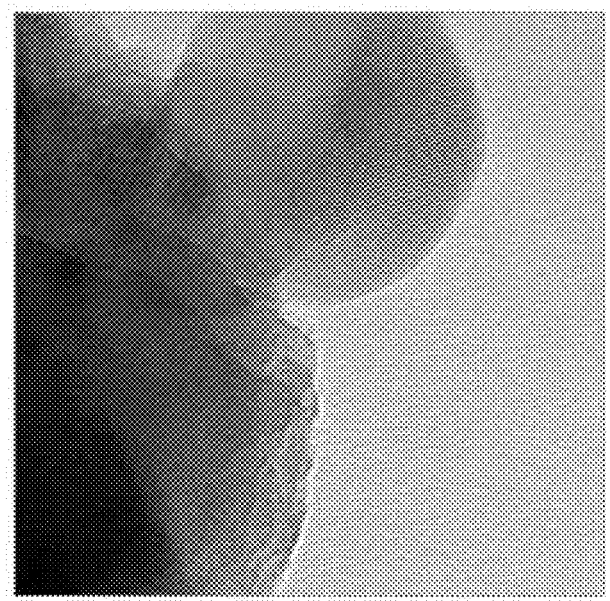
FIG. 7A is a transmission electron microscopy (TEM) image of an example rare earth element-containing solid according to at least one embodiment of the present disclosure.

The impact of supercritical $CO_2$ (SC—$CO_2$) on the extraction of rare earth elements was investigated and compared to non-SC—$CO_2$ extraction. The ashes (3 grams) extracted with SC—$CO_2$ and the ashes not extracted with SC—$CO_2$ were then extracted with w/w HCl for four operations. The four aliquots of extracted solution for each sample were combined and the concentration of rare earth elements was determined by ICP-MS. The results are presented in FIG. 6, where control refers to the non-SC—$CO_2$ extraction and SC—$CO_2$ refers to the SC—$CO_2$ extraction. The amount of REEs from 3 g of coal ash for each sample is reported.

The results demonstrate that, e.g., the treatment with supercritical $CO_2$ can enhance the extraction efficiency of the subsequent rare earth element extraction with acid (~2% w/w HCl solution). The impact can be significant. For example, the extraction efficiency can be enhanced from about 0.6% to about 28.7% in these examples.

Because fly ashes contain high concentrations of Fe, the Fe in fly ash themselves can be used for assisting REEs extraction. Fe in fly ashes can react with HCl to form $FeCl_3$. Therefore, $FeCl_3$ along with supercritical $CO_2$—$H_2O$ was used for REEs extraction, and the method was successfully used to achieve an REEs product with a purity of about ≥99%. Such a result is much higher than the 2% goal set by the Department of Energy (DOE).

6. Example Direct Precipitation of Rare Earth Elements

An aliquot of about 20 g filtered leachate was placed in a 50 mL vial. Citric acid (about 0.8 mmol) and oxalic acid (about 1 mmol) were sequentially added to the leachate with an interval of about 15 min. A tumbler was used for mixing. Then the pH of the leachate was adjusted to, e.g., about 1.2, using a ~4 M NaOH solution. The Cherokee station (CH) and Dry Fork Station (FS) leachate showed visible precipitates, while the other four leachates from other fly ashes—DJ, LR-1, LR-2, and WD—remained clear. However, when the pH values of the four clear leachates were adjusted to about 2, precipitates were observed. Then, all six samples were attached to a tumbler and shaken for about 48 hours for better mixing and precipitation. The REE-oxalate precipitates were collected by filtering the solution through a 0.45 μm membrane filter paper. The collected precipitates were then calcined at about 900° C. for about 6 hours to remove carbon. The concentrations of rare earth elements in the solutions prior to and after precipitations were measured by ICP-MS. The amounts of rare earth elements in precipitates were calculated by determining the mass difference between the measured REEs in as-received fly ashes and the measured REE in the precipitated and filtered solutions.

Prior to calcination, the precipitates were mainly in the form of lanthanide oxalate $[Ln_2(C_2O_4)_3]$. After calcination, the carbon is removed and lanthanide oxide $(Ln_2O_3)$ is obtained. Table 7 shows the percentages of REE (element-based) in the REE-containing solids by mass. Solids containing greater than about 2 wt % REE (DOE target) were produced from FS coal fly ash. In Table 7, REEs precipitated refers to the weight percent of REEs in the solution that was removed by precipitation. REEs in precipitate refers to the weight percent of REEs in the precipitate.

TABLE 7

Percent of REEs in Precipitate Using Oxalic Acid

| Ash Sample | REEs in precipitate from filtration, mg | REEs in resultant extraction solution, mg | REEs precipitated, wt % | Precipitate, mg | REEs in precipitate, wt % |
|---|---|---|---|---|---|
| CH | 0.238 | 0.246 | 96.7 | 20.2 | 1.18 |
| DJ | 0.000 | 0.399 | 0.0 | 0.9 | 0.00 |
| FS | 0.206 | 0.438 | 46.9 | 9.9 | 2.08 |
| LR-1 | 0.041 | 0.390 | 10.6 | 4.3 | 0.96 |
| LR-2 | 0.010 | 0.291 | 3.4 | 5.9 | 0.17 |
| WD | 0.000 | 0.464 | 0.0 | 11.4 | 0.00 |

7. Example Coagulation

An REE-containing solution was coagulated with $NH_4OH$ solution followed by filtering, cyclically, to remove Ca and Mg. The Fe dissolved from the original ash can act as the coagulant. After the removal of Ca and Mg, oxalic acid was added to precipitate REE from the solution. The precipitates are in the form of lanthanide oxalate $[Ln_2(C_2O_4)_3]$. When heated at about 900° C., the precipitates decomposed, and lanthanide oxide $(Ln_2O_3)$ was formed. The REE product was dissolved in nitric acid solution and the concentration of REE was measured by ICP-MS. The products contain about 35.7% REE on an elemental basis (Table 8). The % REE on an elemental basis was determined based on the molecular mass of individual REEs, not the REEs converted to oxides.

TABLE 8

Percentage of Individual Rare Earth Elements and Impurities after Coagulation, Precipitation, and Calcination

| Rare Earth Elements | | Undesired Metals |
|---|---|---|
| Ce: 1.3% | Nd: 8.1% | Al: 3.9% |
| Dy: 2.1% | Pr: 1.7% | Fe: 15.5% |
| Er: 1.3% | Sm: 2.5% | Ca: 34.5% |
| Eu: 0.6% | Tb: 0.4% | K: 0.2% |
| Gd: 2.4% | Tm: 0.2% | Mg: 0.8% |
| Ho: 0.4% | Y: 9.0% | Na: 2.2% |
| La: 4.4% | Yb: 1.1% | Si: 7.6% |
| Lu: 0.2% | | |

The results indicate that coagulation can be used to remove major inorganic impurities. Repetitive coagulation is found to effectively remove impurities including, but not limited to, Ca, Mg, K, Na up to about 99% or more in about three coagulation cycles. About 90% or more of Fe can also be removed by this method. Al and Si served as the coagulant, and the Al and Si can be removed using an alkaline solution. In some examples, about 87.2% or more of the total impurities can be removed.

9. TEM and SEM Analysis

Figure 8A:
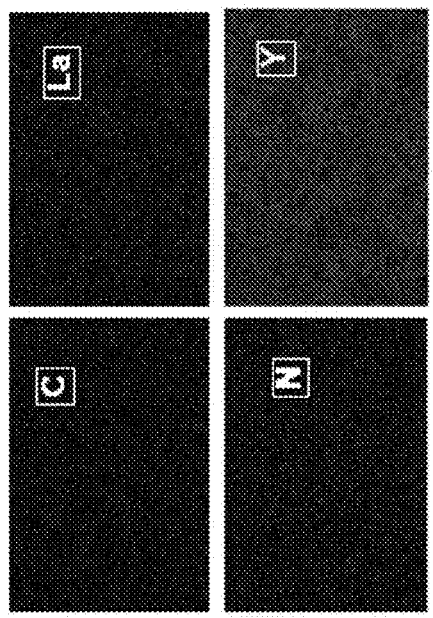
FIG. 8A is a scanning electron microscopy (SEM) image showing the morphology of an example rare earth element-containing solid obtained by methods described herein according to at least one embodiment of the present disclosure.
Figure 8B:
FIG. 8B is a SEM image of FIG. 9A showing the dispersion of Ce, La, Nd, and Y according to at least one embodiment of the present disclosure.

The dispersion of rare earth element-containing solids was analyzed by a transmission electron microscopy (TEM, FEI Tecnai G2 F20 S-Twin, 200 kV). Samples for TEM observations were prepared by dispersing the solids in ethanol and drying one drop of the solution on copper grids. The TEM images shown in FIGS. 8A and 8B are the intermediates and final products of rare earth element-containing solids, respectively. The final products are rare earth element oxides and the intermediates are those rare earth containing products with impurities that are removed by methods described herein. The rare earth element-containing solids show lattice space patterns, indicating that the solids contain rare earth elements.

Figure 9:
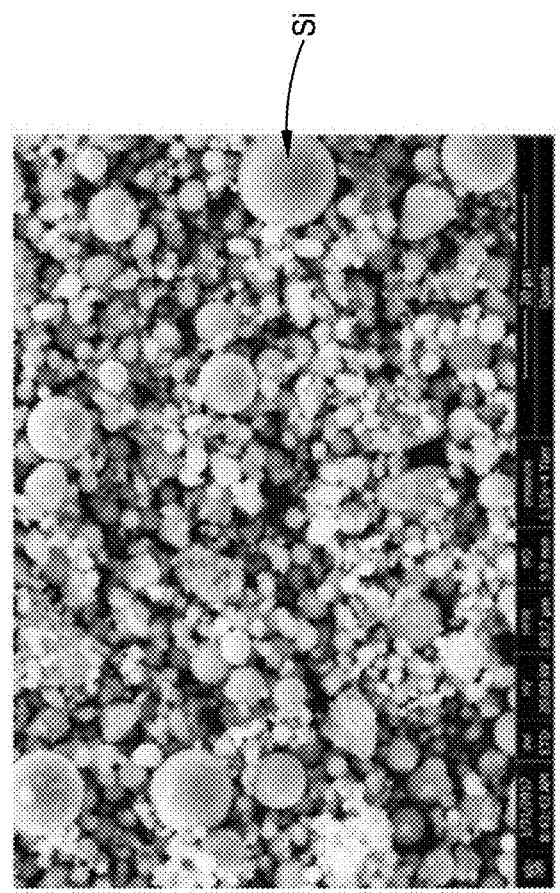
FIG. 9 is a SEM image of an original coal fly ash sample, showing the Si spherical particles, according to at least one embodiment of the present disclosure.

The morphology and dispersion of REE oxide particles were examined using a scanning electron microscope (SEM) in HV mode with an accelerating voltage of 20 kV (SEM-EDS, FEI Quanta FEG MK2; Oxford Instruments America, Model #51-XMX0005). The SEM images of rare earth element-containing solids are shown in FIGS. 8A and 8B, and the SEM image of the original coal fly ash is shown in FIG. 9.

Figure 8C:
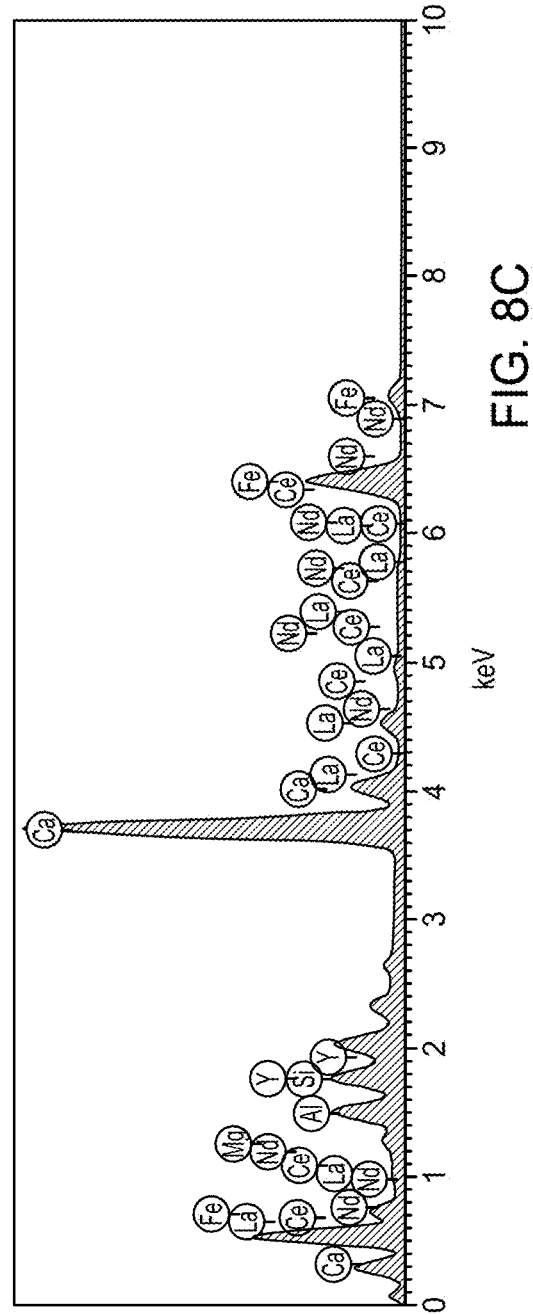
FIG. 8C is an energy dispersive x-ray spectroscopy (EDS) spectrum of rare earth element-containing solid of FIG. 9A according to at least one embodiment of the present disclosure.

The SEM images indicated that Ce, La, Nd, and Y are the dominant rare earth element species in the solids. The SEM images also show that these rare earth elements were evenly distributed. The EDS spectra shown in FIG. 8C demonstrated that Ca, Fe, Mg, Al, Si are the dominant inorganic impurities in the rare earth element-containing solids which was confirmed by the ICP-MS analyses. Although most Ca had been removed, residual Ca can still make up a large portion of impurities in the rare earth element-containing solids. In the original coal fly ash sample, Si is the predominant species morphologically as shown in FIG. 9.

Rare earth elements are important materials and provide significant values to, e.g., national security, energy production, environmental protection, and economic growth. The supply of rare earth elements in the U.S. relies solely on importing as domestic production of rare earth elements has ceased because of the environmental concerns due to mining and lack of competitiveness. Nonetheless, unconventional rare earth element-containing resources, such as produced water, acid mine drainage, coal, coal by-products, and coal-derived products contain large amounts of rare earth elements. However, the concentrations of rare earth elements in these resources are several orders of magnitude lower than that of rare earth element ores. Thus, extraction of rare earth elements from these materials is challenging.

As described herein, the methods and apparatus overcome such challenges by enabling extraction of rare earth elements from unconventional resources such as coal, coal by-products, and coal-derived products. Extraction of rare earth elements from these unconventional resources are contemplated to be viable methodologies to secure domestic supply of these critical materials. In some examples, concentrating rare earth elements goes from about 312 ppm in fly ash to about 99.4% in the final product. In some examples, five rare earth elements (Dy, Eu, Nd, Tb, and Y) can account for up to about 63% of the total weight of all rare earth elements in the final product having about 99.4% purity. The rare earth element extraction methods described herein are environmentally friendly, cost-effective, and can be scaled-up to commercial needs.

The descriptions of various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

As used herein, a "composition" can include component(s) of the composition and/or reaction product(s) of two or more components of the composition.

While the foregoing is directed to embodiments of the present disclosure, other and further embodiments of the disclosure may be devised without departing from the basic scope thereof, and the scope thereof is determined by the claims that follow.

What is claimed is:

1. A method of removing a rare earth element from a coal-derived product, comprising:
   disposing the coal-derived product in a reactor, the coal-derived product comprising the rare earth element and a metal, the metal comprising Al, Fe, or a combination thereof;
   contacting the coal-derived product with supercritical $CO_2$ and an acid to form a mixture;
   removing at least a portion of the metal from the mixture to form a first composition having a reduced content of the metal; and
   precipitating a second composition from the first composition, the second composition comprising the rare earth element from the mixture.

2. The method of claim 1, wherein:
   the acid comprises an inorganic acid, organic acid, or a combination thereof; and
   the acid is in the form of a 0.1% w/w solution to 10% w/w solution.

3. The method of claim 2, wherein when the acid comprises the inorganic acid, the inorganic acid comprises HCl, $H_2SO_4$, $HNO_3$, or combinations thereof.

4. The method of claim 2, wherein when the acid comprises the organic acid, the organic acid comprising a $C_1$-$C_{25}$ carboxylic acid.

5. The method of claim 4, wherein the organic acid comprises oxalic acid, citric acid, formic acid, lactic acid, acetic acid, uric acid, malic acid, tartaric acid, or combinations thereof.

6. The method of claim 1, wherein the acid is selected from the group consisting of oxalic acid, citric acid, and combinations thereof.

7. The method of claim 1, wherein the acid is formic acid.

8. The method of claim 1, wherein the acid is in the form of a 1% w/w solution to 5% w/w solution.

9. A method of removing a rare earth element from a coal-derived product, the method comprising:
   disposing the coal-derived product in a reactor, the coal-derived product comprising the rare earth element and a metal, the metal comprising Al, Fe, or a combination thereof;
   contacting the coal-derived product with supercritical $CO_2$ and an organic acid to form a mixture;
   removing at least a portion of the metal from the mixture to form a first composition having a reduced content of the metal; and
   precipitating a second composition from the first composition, the second composition comprising the rare earth element from the mixture.

10. The method of claim 9, wherein when the organic acid comprises a $C_1$-$C_{25}$ carboxylic acid.

11. The method of claim 9, wherein the organic acid is selected from the group consisting of oxalic acid, citric acid, formic acid, lactic acid, acetic acid, uric acid, malic acid, tartaric acid, and combinations thereof.

12. The method of claim 9, wherein the organic acid is selected from the group consisting of oxalic acid, citric acid, and combinations thereof.

13. The method of claim 9, wherein the organic acid is formic acid.

14. The method of claim 13, wherein the organic acid is in the form of a 0.25% w/w solution to 25% w/w solution.

15. A method of removing a rare earth element from a coal-derived product, the method comprising:
   disposing the coal-derived product in a reactor, the coal-derived product comprising the rare earth element and a metal, the metal comprising Al, Fe, or a combination thereof;
   contacting the coal-derived product with supercritical $CO_2$ and an inorganic acid to form a mixture;
   removing at least a portion of the metal from the mixture to form a first composition having a reduced content of the metal; and
   precipitating a second composition from the first composition, the second composition comprising the rare earth element from the mixture.

16. The method of claim 15, wherein the inorganic acid is selected from the group consisting of HCl, $H_2SO_4$, $HNO_3$, and combinations thereof.

17. The method of claim 15, wherein the inorganic acid is in the form of a 0.1% w/w solution to 10% w/w solution.

18. The method of claim 17, wherein the inorganic acid is in the form of a 1% w/w solution to about 5% w/w solution.

* * * * *